(12) United States Patent
Cho et al.

(10) Patent No.: US 11,403,378 B2
(45) Date of Patent: Aug. 2, 2022

(54) ELECTRONIC APPARATUS AND CONTROLLING METHOD THEREOF

(71) Applicant: Samsung Electronics Co., Ltd., Suwon-si (KR)

(72) Inventors: Wonjoon Cho, Suwon-si (KR); Jinsung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 459 days.

(21) Appl. No.: 16/519,356

(22) Filed: Jul. 23, 2019

(65) Prior Publication Data
US 2020/0026836 A1    Jan. 23, 2020

(30) Foreign Application Priority Data
Jul. 23, 2018    (KR) .................. 10-2018-0085619

(51) Int. Cl.
*G06F 21/32*    (2013.01)
*H04L 9/40*    (2022.01)
*G06V 40/13*    (2022.01)
*G06V 40/12*    (2022.01)

(52) U.S. Cl.
CPC .............. *G06F 21/32* (2013.01); *G06V 40/13* (2022.01); *G06V 40/1365* (2022.01); *H04L 29/06809* (2013.01); *H04L 63/0861* (2013.01)

(58) Field of Classification Search
None
See application file for complete search history.

(56) References Cited

U.S. PATENT DOCUMENTS

| 9,131,377 | B2 | 9/2015 | Huang |
| 9,235,746 | B2 | 1/2016 | Jung et al. |
| 10,028,143 | B2 * | 7/2018 | Lee .................. G06Q 20/40145 |
| 2006/0156028 | A1 | 7/2006 | Aoyama et al. |

(Continued)

FOREIGN PATENT DOCUMENTS

| JP | 2013-200798 A | 10/2013 |
| KR | 10-2013-0044292 A | 5/2013 |

(Continued)

OTHER PUBLICATIONS

International Search Report dated Nov. 20, 2019, cited in an International Application No. PCT/KR2019/009068.

(Continued)

*Primary Examiner* — Piotr Poltorak
(74) *Attorney, Agent, or Firm* — Jefferson IP Law, LLP

(57) ABSTRACT

An electronic apparatus for performing a user authentication is provided. The electronic apparatus includes an input and at least one processor configured to perform a user authentication based on user authentication information input through the input and user authentication information pre-stored in the electronic apparatus while the electronic apparatus is in a lock state, switch the electronic apparatus to be in a lock release state when the user authentication is successful, and enhance security for use of the electronic apparatus in the lock release state when the user authentication is successful based on the user authentication information input after a user authentication failure occurs from the input of the user authentication information input a predetermined number of times or more.

16 Claims, 17 Drawing Sheets

(56) References Cited

U.S. PATENT DOCUMENTS

| | | | |
|---|---|---|---|
| 2013/0122866 A1* | 5/2013 | Huang | G06F 21/31 |
| | | | 455/411 |
| 2014/0115695 A1 | 4/2014 | Fadell et al. | |
| 2014/0123275 A1* | 5/2014 | Azar | G06F 21/36 |
| | | | 726/19 |
| 2015/0128257 A1 | 5/2015 | Zhao et al. | |
| 2016/0335495 A1 | 11/2016 | Kim et al. | |
| 2017/0243075 A1 | 8/2017 | Hanna | |
| 2018/0189470 A1* | 7/2018 | Kim | G06F 21/316 |
| 2019/0039564 A1* | 2/2019 | Nishikawa | B60R 25/257 |
| 2019/0370448 A1* | 12/2019 | Devine | G06F 21/32 |

FOREIGN PATENT DOCUMENTS

| | | |
|---|---|---|
| KR | 10-2015-0034832 A | 4/2015 |
| KR | 10-2016-0116106 A | 10/2016 |
| KR | 10-2016-0118508 A | 10/2016 |
| WO | 2018-035930 A1 | 3/2018 |

OTHER PUBLICATIONS

Extended European Search Report dated May 10, 2021, issued in European Patent Application No. 19840095.4.

\* cited by examiner

ELECTRONIC APPARATUS AND CONTROLLING METHOD THEREOF

CROSS-REFERENCE TO RELATED APPLICATION(S)

This application is based on and claims priority under 35 U.S.C. § 119 of a Korean patent application number 10-2018-0085619, filed on Jul. 23, 2018, in the Korean Intellectual Property Office, the disclosure of which is incorporated by reference herein in its entirety.

BACKGROUND

1. Field

The disclosure relates to an electronic apparatus performing a user authentication. More particularly, the disclosure relates to an electronic apparatus in which a user biometric authentication is performed based on input user authentication information and the number of a user authentication failure even though the user authentication is successful.

2. Description of Related Art

For security of an electronic apparatus, the prior art keeps the electronic apparatus to be in a lock state, thereby preventing the electronic apparatus from performing functions thereof or from executing an application stored therein. Also, the prior art utilizes a mechanism in which the electronic apparatus is switched to be in a lock release state only when a specific user authentication is input.

For the user authentication, an authentication such as a password input or a pattern input has been generally used, and recently, user biometric authentication such as the user fingerprint authentication, iris authentication, voice authentication, and face authentication has been used more frequently.

However, the password input or the pattern input may be an authentication type relatively easily solved by a person other than a user of the electronic apparatus. Whereas, the user biometric authentication is not easy for others to solve, but an authentication process is bothersome and time-consuming. Therefore, it is necessary to use these various types of authentication in a timely manner.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide as least the advantages described below. Accordingly, an aspect of the disclosure is to provide an electronic apparatus and a controlling method thereof, in which a user authentication is performed to switch the electronic apparatus to be in a lock release state based only on simple information input such as password input or pattern input. However, a user biometric authentication is further performed depending on the number of a user authentication failure, thereby relieving inconvenience in the user biometric authentication and enhancing security of the electronic apparatus.

Additional aspects will be set forth in part in the description which follows and, in part, will be apparent from the description, or may be learned by practice of the presented embodiments.

In accordance with an aspect of the disclosure, an electronic apparatus is provided. The electronic device includes an input and at least one processor configured to perform a user authentication based on user authentication information input through the input and user authentication information pre-stored in the electronic apparatus while the electronic apparatus is in a lock state, switch the electronic apparatus to be in a lock release state when the user authentication is successful, and enhance security for use of the electronic apparatus in the lock release state when the user authentication is successful based on the user authentication information input after a user authentication failure occurs from the input of the user authentication information input a predetermined number of times or more.

Here, the at least one processor may further be configured to perform user re-authentication based on user biometric information input through the input when the user authentication is successful based on the user authentication information input after the user authentication failure occurs from the input user authentication information the predetermined number of times or more.

In this case, the user authentication information may include a predetermined pattern or a password, and the user biometric information may include user fingerprint or user iris.

In addition, the at least one processor may further be configured to switch the electronic apparatus back to be in the lock state in a situation where the user re-authentication failure occurs.

Meanwhile, the at least one processor may further be configured to perform the user re-authentication when a predetermined application is executed in a situation where the electronic apparatus is in the lock release state.

Here, the predetermined application may include at least one of an application set to perform an automatic user login or an application storing user personal information, among applications providing a service requiring a user login.

Meanwhile, the at least one processor may further be configured to enhance security for lock of the electronic apparatus in the lock state in a situation where the user authentication failure occurs the predetermined number of times or more.

In this case, the at least one processor may further be configured to obtain the user biometric information through the input and perform the user re-authentication based on the input user biometric information while the user inputs the user authentication information to switch the electronic apparatus to be in the lock release state in a situation where the user authentication failure occurs the predetermined number of times or more.

Here, the at least one processor may further be configured to keep the electronic apparatus to be in the lock state in a situation where the user re-authentication failure occurs.

In accordance with another aspect of the disclosure, a controlling method of an electronic apparatus is provided. The controlling method of an electronic apparatus includes performing a user authentication based on input user authentication information and pre-stored user authentication information in the electronic apparatus while the electronic apparatus is in a lock state, switching the electronic apparatus to be in a lock release state when the user authentication is successful, and enhancing security for use of the electronic apparatus in the lock release state when the user authentication is successful based on the user authentication information input after a user authentication failure occurs from the input user authentication information a predetermined number of times or more.

In this case, in the enhancing of the security for the use of the electronic apparatus, user re-authentication may be performed based on input user biometric information when the user authentication is successful based on the user authentication information input after the user authentication failure occurs from the input user authentication information the predetermined number of times or more.

Here, the user authentication information may include a predetermined pattern or a password, and the user biometric information may include user fingerprint or user iris.

In addition, in the enhancing of the security for the use of the electronic apparatus, the electronic apparatus may be switched back to be in the lock state when a user re-authentication failure occurs.

Meanwhile, in the enhancing of the security for the use of the electronic apparatus, the user re-authentication may be performed when a predetermined application is executed in a situation where the electronic apparatus is in the lock release state.

Here, the predetermined application may include at least one of an application set to perform an automatic user login or an application storing user personal information, among applications providing a service requiring a user login.

Meanwhile, the controlling method may further include enhancing security for lock of the electronic apparatus in the lock state in a situation where the user authentication failure occurs the predetermined number of times or more.

Here, in the enhancing of the security for the lock of the electronic apparatus, the user biometric information may be obtained and the user re-authentication may be performed based on the input user biometric information while the user inputs the user authentication information to switch the electronic apparatus to be in the lock release state in a situation where the user authentication failure occurs the predetermined number of times or more.

In this case, in the enhancing of the security for the lock of the electronic apparatus, the electronic apparatus may be kept to be in the lock state when the user re-authentication failure occurs.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and/or other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
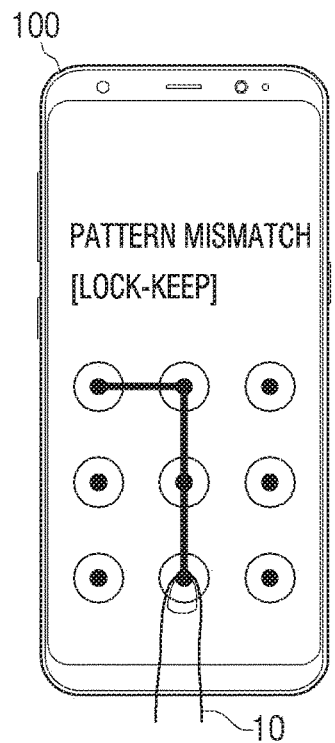
FIGS. 1A, 1B and 1C are diagrams each illustrating a schematic process of an operation of an electronic apparatus according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

Before describing the disclosure in detail, a method of describing the specification and drawings is described.

First, general terms are used in the specification and the claims based on functions thereof in various embodiments in the disclosure. However, such terms may be differently used depending on intentions of a person skilled in the art, a legal or technical interpretation, or an emergence of new technology. In addition, some terms are arbitrarily selected by the applicant. These terms may be construed in the meaning defined herein and, unless otherwise specified, may be construed on the basis of the entire contents of the specification and common technical knowledge in the art.

In addition, throughout the accompanying drawings of the specification, the same reference numerals denote parts or components performing substantially the same functions. For convenience of explanation and understanding, different embodiments are described using the same reference numerals or signs. In other words, even though all the elements having the same reference numerals are illustrated in a plurality of drawings, the plural drawings may not refer to the same embodiment.

In the specification and the claims, a term including an ordinal number such as "first", "second" or the like may be used only to distinguish the same or similar components from each other and therefore, each of the components is not limited by the ordinal number. The terms are used to distinguish one component from another component. For example, any component associated with such an ordinal number is not limited in the orders of use, placement or the like. When necessary, each ordinal number may be used interchangeably.

In the specification, singular forms include plural forms unless the context clearly indicates otherwise. It is to be further understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

In the embodiment in the disclosure, a term such as a "module", a "unit" or a "part" is used to indicate a component performing at least one function or operation, and enabled to be implemented with hardware, software, or a combination of hardware and software. In addition, a plurality of "modules", "units", "parts" or the like may be integrated into at least one module or chip and implemented with at least one processor (not shown) except for a case in which a "module", a "unit" or a "part" has to be individually implemented with a specific hardware.

In addition, in the specification, it is to be understood that when one component is referred to as being 'connected to' another component, it may be connected directly to another component or be indirectly connected to another component with a third component interposed therebetween. Unless explicitly described otherwise, "comprising" any components is to be understood to imply the inclusion of other components but not the exclusion of any other components.

Figure 1B:
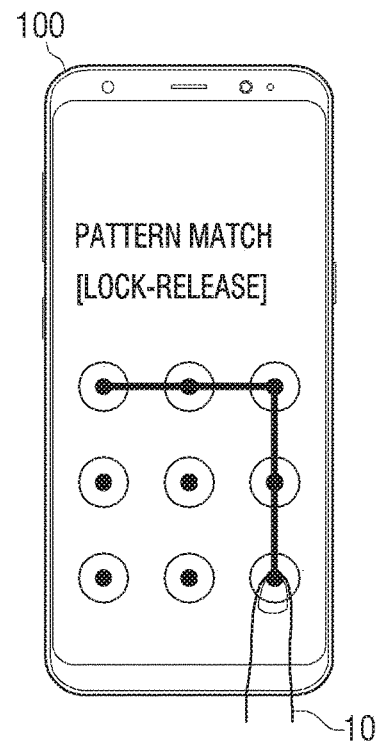
Figure 1C:
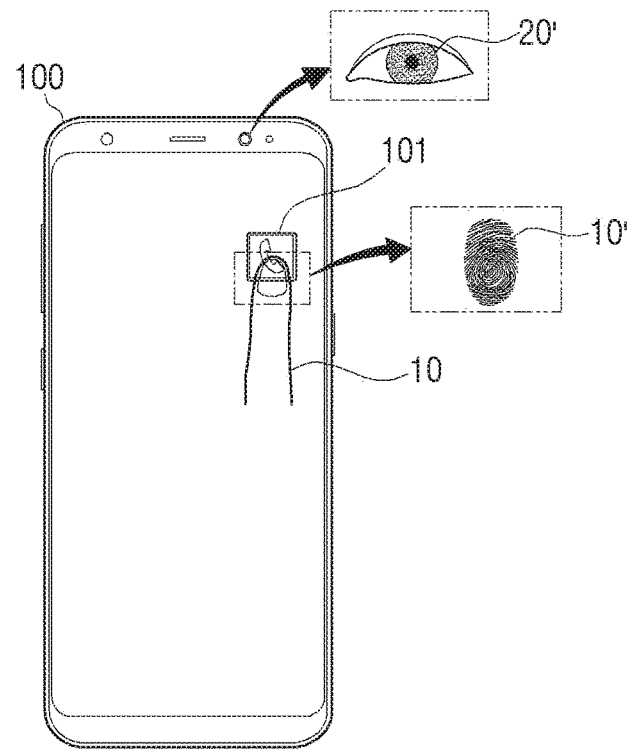

FIGS. 1A, 1B and 1C are diagrams each illustrating a schematic process in which an electronic apparatus according to various embodiments of the disclosure operates.

FIG. 1A assumes that a user touches a screen of an electronic apparatus 100 with a user finger 10 to input a pattern for releasing lock of the electronic apparatus 100.

Referring to FIG. 1A, when a user input pattern does not match a pattern pre-stored in the electronic apparatus 100, a user authentication failure occurs, which results in that the electronic apparatus 100 displays a text such as a 'pattern mismatch' and a 'lock keep' on a front thereof. That is, when the pattern input by the user does not match the pre-stored pattern, the electronic apparatus 100 may be kept to be in a lock state.

Referring to FIG. 1B, it illustrates a situation where after several user authentication failures occur as illustrated in FIG. 1A, the user inputs the same pattern as the pattern pre-stored in the electronic apparatus 100 and thus a user authentication is successful.

Referring to FIG. 1C, as the user authentication is successful, the electronic apparatus 100 is switched to be in a lock release state, such that the user may execute a call application among applications stored in the electronic apparatus 100.

Here, the user may touch a call icon 101, displayed on the electronic apparatus 100 and corresponding to the call application, with the user finger 10 to execute the call application.

However, here, the electronic apparatus 100 may enhance security for use of the electronic apparatus in the lock release state. For example, the electronic apparatus 100 may recognize a user fingerprint 10' of a point on which the user touches with the user finger 10, or recognize a user iris 20' by capturing the user eye when the user uses the electronic apparatus 100.

In this case, the user may or may not be notified by the electronic apparatus 100 that the user fingerprint 10' or the user iris 20' is recognized by the electronic apparatus, As such, as the user authentication is successful by the pattern input, the electronic apparatus 100 is switched to be in the lock release state, and thus the user may unrestrictedly use the call application stored in the electronic apparatus 100. However, the user authentication failure as illustrated in FIG. 1A occurs several times until the user authentication is successful, and thus the security for the use of the electronic apparatus 100 is enhanced. As a result, even while the user uses the application stored in the electronic apparatus 100, a user re-authentication may be further performed based on the user fingerprint 10' or the user iris 20'.

When the user re-authentication failure occurs, the electronic apparatus 100 may be switched back to be in the lock state.

FIGS. 1A, 1B and 1C each illustrates an example of the schematic operation of the electronic apparatus 100 according to the disclosure; and FIGS. 2 to 12 each illustrates a detailed embodiment of the electronic apparatus 100 according to the disclosure based on each component and an operation of each component.

Figure 2:
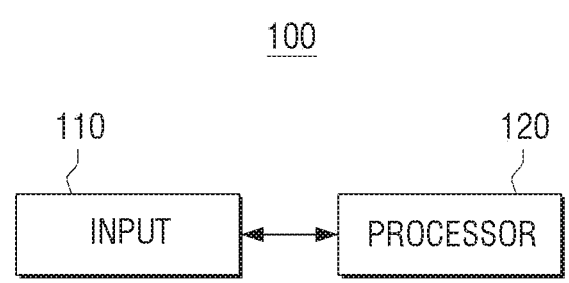
FIG. 2 is a block diagram illustrating a configuration of an electronic apparatus according to an embodiment of the disclosure.

FIG. 2 is a block diagram illustrating a configuration of an electronic apparatus according to an embodiment of the disclosure.

The electronic apparatus 100 may be implemented as a wireless communication device or a terminal apparatus such as a mobile phone or a smart phone. The electronic apparatus 100 may be implemented as a television (TV), a desktop personal computer (PC), a laptop PC, a tablet PC, a wearable device, a set-top box, a server or the like, or may be implemented as one of various electronic appliances that operate electronically. Also, the electronic apparatus 100 may be implemented in a form of a system including one or more electronic apparatuses (not illustrated).

Referring to FIG. 2, the electronic apparatus 100 may include: an input 110; and a processor 120.

The input 110 may obtain a variety of inputs related to the electronic apparatus 100.

The input 110 may receive a command or information that the user inputs to the electronic apparatus 100 in various manners. For example, the input 110 may obtain a command or information input to the electronic apparatus 100 in the form of a signal, voice, touch or button manipulation.

The input 110 may obtain a user authentication information input to the electronic apparatus 100 to perform the user authentication. In this case, the input 110 may obtain a combination of numbers and/or characters based on button manipulation, touch, voice or the like.

In addition, the input 110 may obtain information on a specific pattern or order based on button manipulation, touch, voice and the like.

Figure 12:
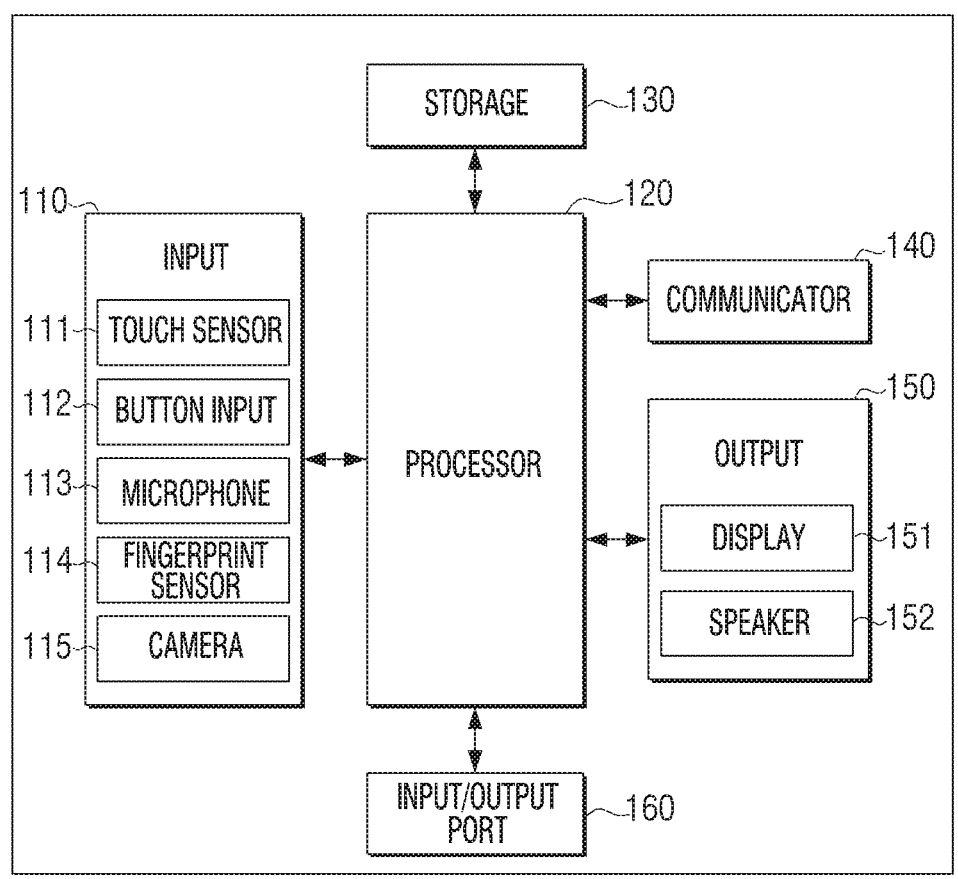
FIG. 12 is a block diagram illustrating a detailed configuration of an electronic apparatus according to an embodiment of the disclosure.

The input 110 may also obtain user biometric information input to the electronic apparatus 100. In this case, the user biometric information may be the user fingerprint, iris, face, voice, body temperature, pulse, heart rate and the like; and the input 110 may include an optical sensor, a camera, a microphone, a temperature measurement sensor and the like. FIG. 12 illustrates an example of a configuration of the input 110.

The processor 120 may control configurations of the electronic apparatus 100 as a whole.

The processor 120 may control not only the input 110 but also perform various operations by controlling the configurations of the electronic apparatus 100 based on a command or information input through the input 110.

For example, the processor 120 may perform the user authentication based on information input through the input 110 to switch the state of the electronic apparatus 100 from the lock state to the lock release state or from the lock release state to the lock state.

When the electronic apparatus 100 is in the lock state, the electronic apparatus 100 may not be able to perform some of the functions that the electronic apparatus 100 may perform. In detail, when the electronic apparatus 100 is in the lock state, one or more applications stored in the electronic apparatus 100 and executable by the electronic apparatus 100 may not be executed.

Here, the input 110 may obtain information only input in a specific form. For example, even though the input 110 may obtain a command or information in various forms such as signal, voice, touch, button manipulation or the like, the input 110 may be able to obtain information only input in a form of a user touch.

In addition, when the electronic apparatus 100 is in the lock state, the processor 120 may perform only predetermined operations. For example, the processor 120 may not execute an application pre-stored in the electronic apparatus 100, but may perform only the user authentication based on the command or information obtained only through the input 110.

The processor 120 may perform the user authentication based on the user authentication information input through the input 110 and switch the electronic apparatus 100 to be in the lock release state based on the user authentication.

In detail, the processor 120 may perform the user authentication based on the user authentication information input through the input 110 and the user authentication information pre-stored in the electronic apparatus 100 while the electronic apparatus 100 is in the lock state. Here, the user authentication may be successful only when the user authentication information input through the input 110 matches, i.e. is identical to the user authentication information pre-stored in the electronic apparatus 100.

When the input user authentication information does not match the pre-stored user authentication information, the user authentication failure occurs and the processor 120 may keep the electronic apparatus 100 to be in the lock state. To the contrary, the processor 120 may switch the electronic apparatus to be in the lock release state when the user authentication is successful.

Here, the user authentication information may refer to a predetermined pattern, a combination of numbers and/or characters, a specific word or the like. In this case, the pattern may refer to a touch pattern on the electronic apparatus 100, a manipulation pattern of one or more button (not illustrated) included in the electronic apparatus 100 and the like.

For example, in a situation where information on a specific touch pattern is stored in the electronic apparatus 100, when the user draws the same touch pattern on the electronic apparatus 100 as the specific touch pattern described above, processor 120 may switch the electronic apparatus 100 to be in the lock release state.

Figure 3A:
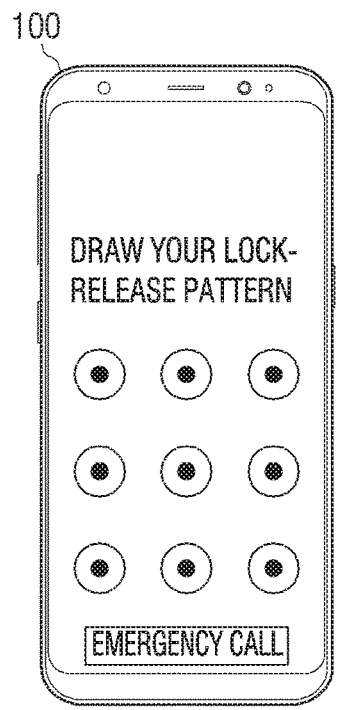
FIGS. 3A, 3B and 3C are diagrams each for explaining an example in which an electronic apparatus according to various embodiments of the disclosure performs a user authentication based on input user authentication information.
Figure 3B:
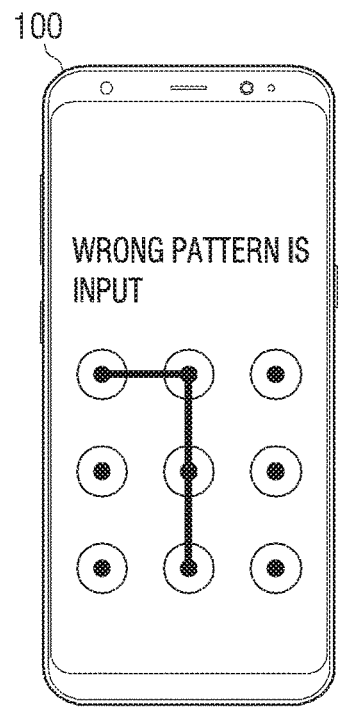
Figure 3C:

FIGS. 3A, 3B and 3C are diagrams each for explaining an example in which an electronic apparatus according to various embodiments of the disclosure performs a user authentication based on a pre-stored touch pattern.

Referring to FIG. 3A, the electronic apparatus 100 may display a user interface (UI) including a request to release the lock by drawing a pre-stored lock release pattern, and also display a plurality of points (nine points) on which the lock release pattern is to be drawn.

Referring to FIG. 3B, when a touch pattern drawn by the user does not match the pre-stored lock release pattern, the electronic apparatus 100 may be kept to be in the lock state while displaying a message that a wrong pattern is input.

Referring to FIG. 3C, to the contrary, when the touch pattern drawn by the user exactly matches the pre-stored lock release pattern, the electronic apparatus 100 is switched to be in the lock release state, the electronic apparatus 100 may be switched to a state in which the electronic apparatus 100 may execute an application such as a call, a message or a camera.

As another example, in a situation where information on a specific password is stored in the electronic apparatus 100, when the user inputs the same character string as the above-mentioned specific password to the electronic apparatus 100, the processor 120 may switch the electronic apparatus 100 to be in the lock release state.

Figure 4A:
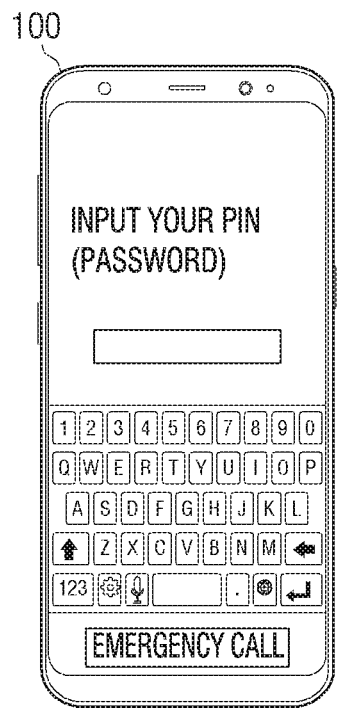
FIGS. 4A, 4B and 4C are diagrams each for explaining an example in which an electronic apparatus according to various embodiments of the disclosure performs a user authentication based on input user authentication information.
Figure 4B:
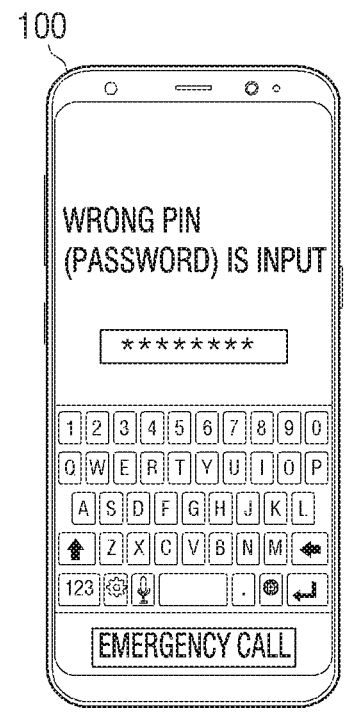
Figure 4C:

FIGS. 4A, 4B and 4C each illustrates an example of performing a user authentication based on a pre-stored password.

Referring to 4A, the electronic apparatus 100 may display a UI including a request to input a personal identification number (PIN) to switch the electronic apparatus 100 to be in the lock release state, while displaying a keyboard to input the PIN.

Referring to FIG. 4B, when characters input by the user through the keyboard do not match a pre-stored PIN, the electronic apparatus 100 may display a message that a wrong PIN is input and may be kept to be in the lock state.

To the contrary, when the user correctly inputs the pre-stored PIN, the electronic apparatus 100 may be switched to be in the lock release state, such that the electronic apparatus 100 may be switched to a state in which the electronic apparatus 100 may execute an application such as a call, a message or a camera.

The processor 120 may enhance the security for the use of the electronic apparatus 100 even after the user authentication is performed and the electronic apparatus 100 is switched to be in the lock release state. In detail, the processor 120 may perform the user re-authentication even after performing the user authentication.

Meanwhile, the processor 120 may perform the user re-authentication when the user authentication is not successful. For example, in a state where the user authentication failure occurs once or more and the user authentication is not yet successful, the processor 120 may perform the user re-authentication to enhance security for lock of the electronic apparatus 100. This performance may reinforce a requirement to switch the electronic apparatus 100 to be in the lock release state. That is, the processor 120 may switch the electronic apparatus 100 to be in the lock release state only when the user re-authentication is performed based on the user biometric information, rather than releasing the lock immediately based on the user authentication.

The processor 120 may obtain the user biometric information and perform the user re-authentication based on the obtained user biometric information. In this case, the user biometric information may be at least one of the user fingerprints, iris, face, voice, body temperature and heart rate.

For example, the processor 120 may obtain the user biometric information input through the input 110 and perform the user re-authentication by comparing the input user biometric information with the user biometric information pre-stored in the electronic apparatus 100 each other. In detail, the processor 120 may perform the user re-authentication by comparing the user fingerprint or iris recognized through the input 110 with the user fingerprint or iris pre-stored in a form of data in the electronic apparatus 100.

Here, the processor 120 may perform the user re-authentication only when the input user biometric information matches the user biometric information pre-stored in the electronic apparatus 100, i.e. by a certain ratio or more. When the input user biometric information does not match the pre-stored user biometric information, the user re-authentication failure occurs.

In a situation where the electronic apparatus 100 is in the lock release state based on the input user authentication information, the processor 120 may switch the electronic apparatus 100 back to be in the lock state in a situation where the user re-authentication failure occurs.

As illustrated in FIG. 4C, the processor 120 may perform the user re-authentication implicitly or explicitly.

For example, when performing the user re-authentication implicitly, the processor 120 may automatically recognize the user fingerprint as the user touches the electronic apparatus 100 without providing the user with a notification to input the user fingerprint information or the user iris information. Alternatively, the processor 120 may recognize the user iris from a front image captured by the electronic apparatus 100 while the user inputs a specific command or information to the electronic apparatus 100.

Figure 5A:
FIGS. 5A and 5B are diagrams each for explaining an example in which an electronic apparatus according to various embodiments of the disclosure performs a user re-authentication implicitly.
Figure 5B:
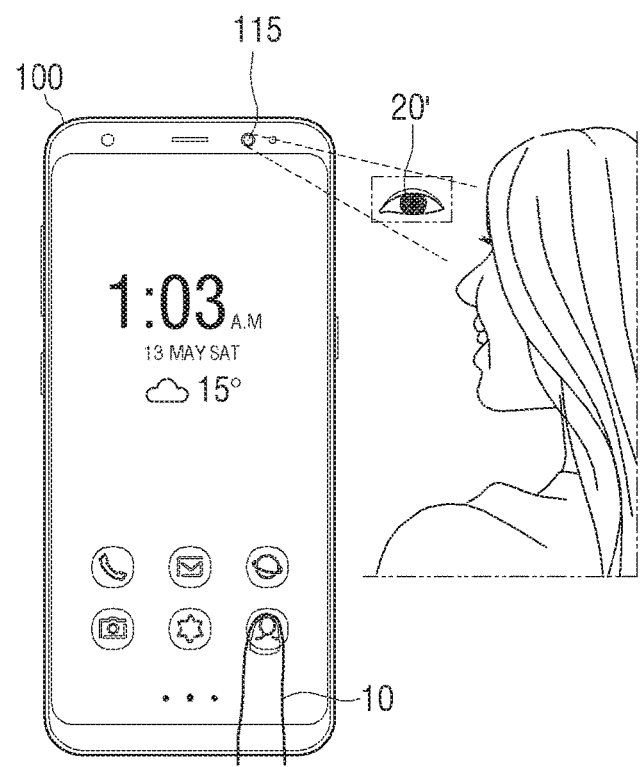

FIGS. 5A and 5B are diagrams each for explaining an example in which an electronic apparatus according to various embodiments of the disclosure performs a user re-authentication implicitly.

Referring to FIG. 5A, it illustrates a situation where, in order to execute an application corresponding to an application icon positioned at a lower right among six application icons currently displayed at a bottom of a screen of the electronic apparatus 100, the user touches the application icon positioned at the lower right with the user finger 10.

In this case, while the user touches the screen of the electronic apparatus 100, the electronic apparatus 100 may recognize the user fingerprint 10' of the user finger 10. Here, the electronic apparatus 100 may not notify the user of the fact that the electronic apparatus 100 currently recognizes the user fingerprint 10'.

In this case, the electronic apparatus 100 may perform the user re-authentication by comparing the recognized user fingerprint 10' with the pre-stored user fingerprint each other.

Similar to FIG. 5A, FIG. 5B also illustrates a situation where the user touches, with the user finger 10, the application icon positioned at the lower right among the six application icons.

In this case, the electronic apparatus 100 may use the camera 115 included in the electronic apparatus 100 to recognize the user iris 20' while the user touches the screen of the electronic apparatus 100. Here, the electronic apparatus 100 may not notify the user of the fact that the electronic apparatus 100 currently captures a front image using the camera 115 and recognizes the user iris 20'.

In this case, the electronic apparatus 100 may perform the user re-authentication by comparing the recognized user iris 20' with the pre-stored user iris each other.

For example, when performing the user re-authentication explicitly, the processor 120 may perform the user re-authentication by providing the user with a notification or UI to input the user biometric information. In this case, the user provided with the notification or UI may input the user biometric information such as the user fingerprint or iris to the electronic apparatus 100. Then, based on the input user biometric information, the processor 120 may perform the user re-authentication.

FIGS. 6, 7A, 7B and 8 are diagrams each for explaining an example in which an electronic apparatus according to various embodiments of the disclosure performs a user re-authentication explicitly.

Figure 7A:
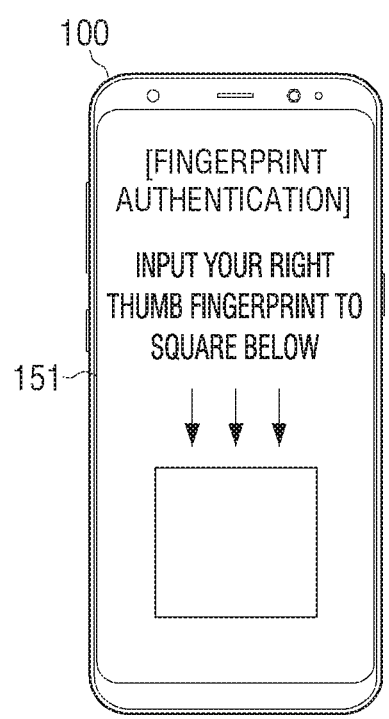
FIGS. 7A and 7B are diagrams each for explaining an example in which an electronic apparatus according to various embodiments of the disclosure performs a user re-authentication explicitly.
Figure 7B:
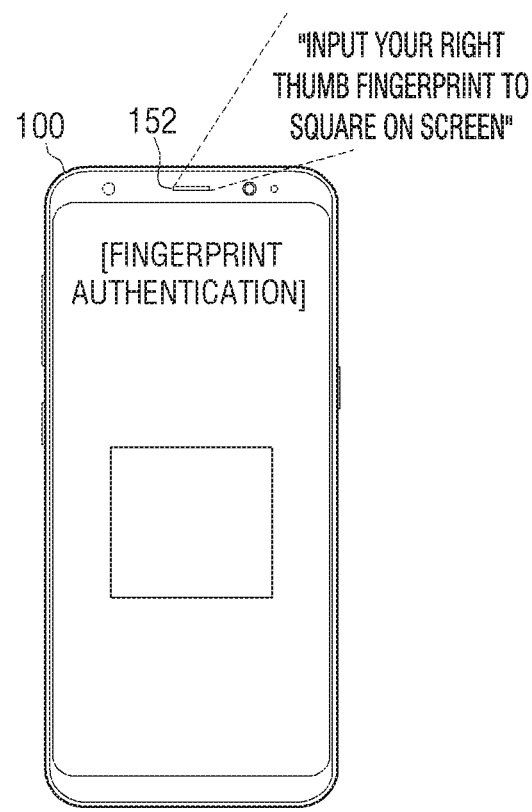
Figure 8:
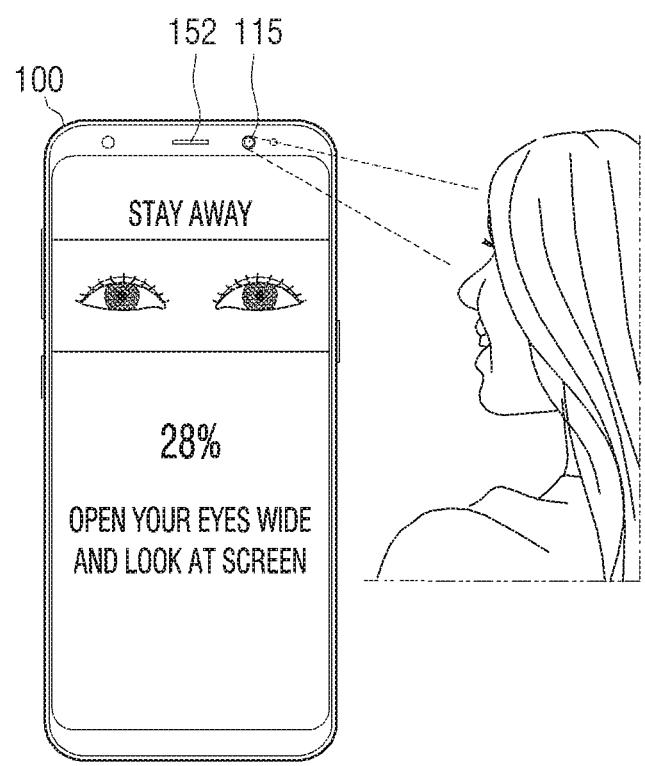
FIG. 8 is a diagram for explaining an example in which an electronic apparatus according to an embodiment of the disclosure performs a user re-authentication explicitly.

A process itself performing the user re-authentication corresponds to the process as described in FIGS. 7A and 7B, FIG. 8 or the like. However, the electronic apparatus 100 may display a UI requesting the user to input the user biometric authentication and/or requesting the user to select a user biometric authentication method prior to the process as described in FIGS. 7A and 7B, FIG. 8 or the like.

Figure 6:
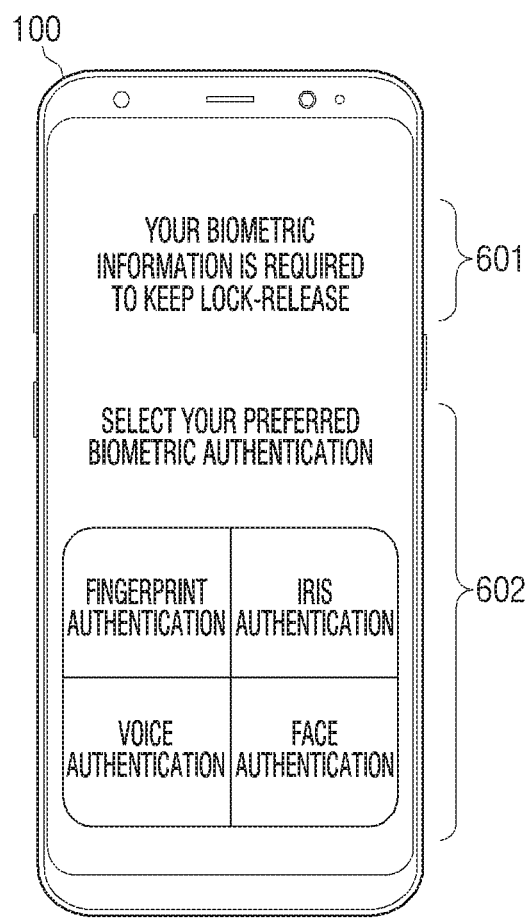
FIG. 6 is a diagram for explaining an example in which an electronic apparatus according to an embodiment of the disclosure performs a user re-authentication explicitly.

For example, FIG. 6 illustrates a situation where the electronic apparatus 100 displays a UI 601 requesting the user to input the user biometric authentication and a user interface (UI) 602 requesting the user to select the user biometric authentication method.

Referring to FIG. 6, the user may recognize the fact that when the user does not perform the user biometric authentication through the UI 601 requesting the user to input the user biometric authentication, the electronic apparatus 100 in the lock release state is switched back to be in the lock state.

In addition, through the UI 602 requesting the user to select the user biometric authentication method, the user may select the user biometric authentication method which the user prefers. In a case of FIG. 6, the user may select (touch) an area including one of a user fingerprint authentication, iris authentication, voice authentication, or face authentication on the screen of the electronic apparatus 100 to perform the user authentication corresponding to the selected area. Meanwhile, FIG. 6 illustrates only the user fingerprint authentication, iris authentication, voice authentication and face authentication; however, the user biometric authentication method which can be selected by the user is not necessarily limited thereto.

When performing the user re-authentication explicitly, the electronic apparatus 100 may perform a user fingerprint authentication immediately. Alternatively, the electronic apparatus 100 may perform the user fingerprint authentication when the user selects the user fingerprint authentication through the same process as illustrated in FIG. 6.

FIGS. 7A and 7B illustrate an example in which when performing the user fingerprint authentication, the electronic apparatus 100 displays a UI requesting the user fingerprint authentication and indicating a user fingerprint authentication method. FIGS. 7A and 7B assume that the user fingerprint authentication is provided on a front screen of the electronic apparatus 100.

Referring to FIG. 7A, the electronic apparatus 100 may display a UI requesting a user fingerprint recognition and the electronic apparatus 100 may display a UI requesting the user fingerprint authentication and indicating the user fingerprint authentication method ("Input the fingerprint of your right thumb to the square below").

Referring to FIG. 7B, the electronic apparatus 100 may request the user fingerprint recognition through the speaker 152 and may output a UI indicating the user fingerprint recognition method ("Input the fingerprint of your right thumb to the square below) by voice.

When the user finger 10 is input to the square as illustrated in FIG. 7A or 7B and thus the user fingerprint is recognized, the electronic apparatus 100 may perform the user re-authentication based on the recognized user fingerprint.

Meanwhile, although FIGS. 7A and 7B assume that a fingerprint sensor (not illustrated) is implemented on the front of the electronic apparatus 100; however, the fingerprint sensor (not illustrated) may be implemented on a partial or entire of a back of the electronic apparatus 100.

FIG. 8 illustrates an example in which when the electronic apparatus 100 performs the user iris authentication, a UI is displayed to request a user iris authentication and to indicate the user iris authentication method according to an embodiment of the disclosure.

Referring to FIG. 8, the electronic apparatus 100 may display a message indicating a completion percentage of the user iris recognition ("28%"), indicating the user iris recognition method ("Open your eyes wide and look at the screen," "Stay away" or "Come closer") or the like.

Referring to FIG. 8, the electronic apparatus 100 may also display an image representing the user captured by the camera 115, such that the user accurately positions the user iris on the camera 115.

In a situation where the processor 120 attempts to perform the user re-authentication implicitly, when the user re-authentication failure occurs a predetermined number of times or more or a predetermined time period or more, the processor 120 may perform the user re-authentication explicitly.

When performing the user authentication, the processor 120 may enhance the security for the use of the electronic apparatus 100 depending on the number of the user authentication failure. Here, the processor 120 may perform the user re-authentication. In this case, the user authentication failure may indicate that the user authentication failure occurs because the input user authentication information does not match the pre-stored user authentication information.

For example, when the user authentication information that does not match the pre-stored user authentication information is input, and thus the user authentication failure occurs; thereafter, the user authentication information (the same as or different from the previous input user authentication information) that does not match the pre-stored user authentication information is again input, and thus the user authentication failure occurs, the number of the user authentication failure is counted as 2.

In a situation where the user authentication failure occurs 'less than' the predetermined number of times, when the input user authentication information input thereafter matches the pre-stored user authentication information, the processor 120 may determine that the user authentication is successful and switch the electronic apparatus 100 to be in the lock release state. Here, as the electronic apparatus 100 is in the lock release state, the user may not have any limitations in using the electronic apparatus 100. For example, the processor 120 may not perform a separate user re-authentication.

In this case, unless there occurs a predetermined event switching the electronic apparatus 100 to be in the lock state (the user inputs nothing to the electronic apparatus 100 longer than the predetermined time, the user presses a button on the electronic apparatus 100 to switch the electronic apparatus 100 to be in the lock state or the like), the processor 120 may keep the electronic apparatus 100 to be in the lock release state.

To the contrary, the processor 120 may determine that the user authentication is successful and switch the electronic apparatus 100 to be in the lock release state when the user authentication information input matches the pre-stored user authentication information after the user authentication failure occurs the predetermined number of times or more. However, unlike the situation where the user authentication failure occurs less than the predetermined number of times, the processor 120 may enhance the security for the use of the electronic apparatus 100. For example, the processor 120 may perform the user re-authentication.

In this case, when the user re-authentication is successful, the processor 120 does not switch the electronic apparatus 100 to be in the lock state; however, when the user re-authentication failure occurs, the processor 120 may switch the electronic apparatus 100 back to be in the lock state.

The reason is that as the number of the user authentication failure increases, the user who attempts the user authentication of the electronic apparatus 100 is more likely to be an outsider rather than a pre-registered user.

For example, in a situation where the user authentication failure occurs two times or less, when the user authentication thereafter is successful at most at a third trial of the user authentication information input, the processor 120 does not perform the user re-authentication. However, in a situation where the user authentication failure occurs three times or more and thereafter, when the user authentication thereafter is successful at fourth or more trials of the user authentication information input, the processor 120 may perform the user re-authentication.

Figure 9A:
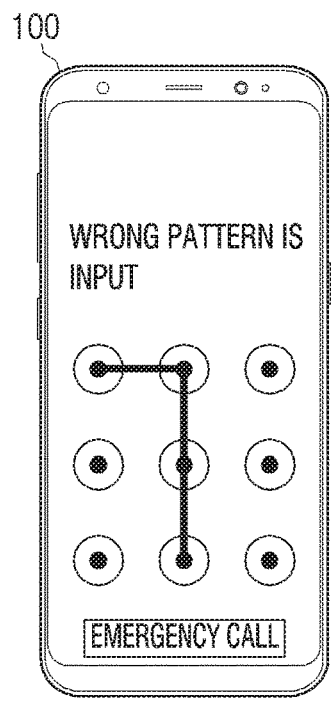
FIGS. 9A, 9B, 9C and 9D are diagrams each for explaining an example in which an electronic apparatus according to various embodiments of the disclosure performs a user re-authentication implicitly or explicitly while user authentication information is input when a user authentication failure occurs a predetermined number of times or more.
Figure 9B:
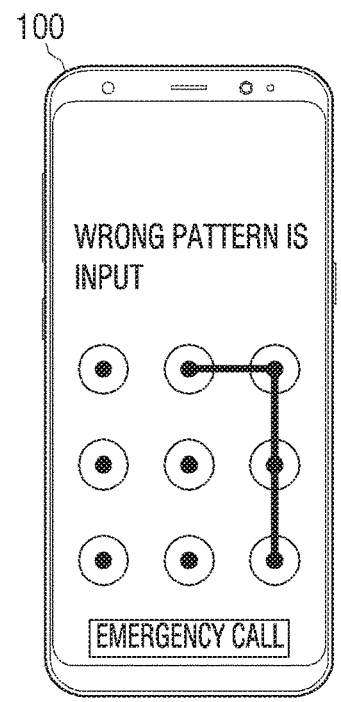
Figure 9C:
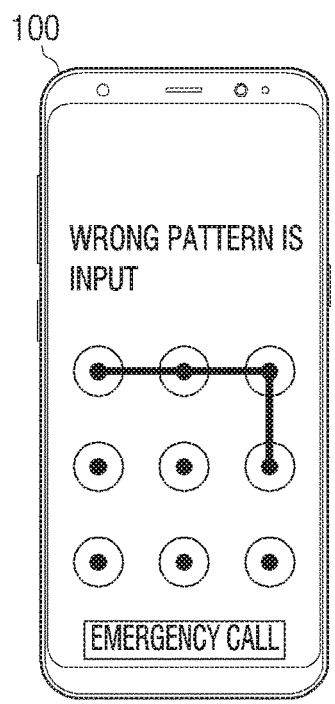
Figure 9D:

For example, referring to FIGS. 9A, 9B, 9C and 9D, in a situation where the user authentication failure occurs three times or more as illustrated in FIGS. 9A, 9B, and 9C, when the user authentication is thereafter successful at the fourth trial and thus the electronic apparatus 100 is switched to be in the lock release state as illustrated in FIG. 9D, the electronic apparatus 100 may perform the user re-authentication implicitly or explicitly.

Here, in a situation where the processor 120 attempts to perform the user re-authentication implicitly, when the user re-authentication failure occurs a predetermined number of times or more or a predetermined time period or more, the processor 120 may perform the user re-authentication explicitly.

Alternatively, the processor 120 may perform the user re-authentication implicitly and/or explicitly on condition that a predetermined application is executed.

In detail, the processor 120 may obtain the user biometric information through the input 110 and perform the user re-authentication based on the input user biometric information when the predetermined application is executed in a situation where the user authentication is successful based on the user authentication information input after the user authentication failure occurs from the input user authentication information the predetermined number of times or more, and thus the electronic apparatus 100 is in the lock release state.

Here, the predetermined application may include at least one of an application set to perform an automatic user login or an application storing user personal information, among applications providing a service requiring a user login.

The application configured to perform the automatic user login refers to an application in which when the application is executed through the electronic apparatus 100, a login to the application is automatically executed based on the user information pre-stored in the electronic apparatus 100 without any separate process of inputting the user information for login to the application.

The predetermined application needs to have relatively high security force, and may be an application having a payment and/or remittance function or a manager application of the electronic apparatus 100.

Meanwhile, the processor 120 may enhance the security for the lock of the electronic apparatus 100 in a situation where the user authentication failure occurs the predetermined number of times or more. For example, in a situation where the user authentication failure occurs the predetermined number of times or more, when the user authentication thereafter is yet to be successful, the processor 120 may perform the user re-authentication implicitly and/or explicitly regardless whether or not the user authentication is successful.

In detail, while the user inputs the user authentication information to switch the electronic apparatus 100 to be in the lock release state, the processor 120 may perform the user re-authentication based on the user biometric information input through the input 110. Here, the processor 120 may obtain the user biometric information through the input 110 while the user manipulation (touch, button manipulation or the like) is performed to input the user authentication information.

For example, in a situation where the user authentication failure occurs three times, the processor 120 may thereafter perform the user re-authentication implicitly while the user inputs the user authentication information fourth time or more. Here, when the input of the user authentication information is performed in a manner in which the user touches the electronic apparatus 100, the processor 120 may obtain the user fingerprint through the input 110 based on a user touch for inputting the user authentication information, and may use the obtained user fingerprint for the user re-authentication. Alternatively, the processor 120 may use the user iris information obtained from the front image captured by the electronic apparatus 100 for the user re-authentication while the user inputs the user authentication information.

Figure 10A:
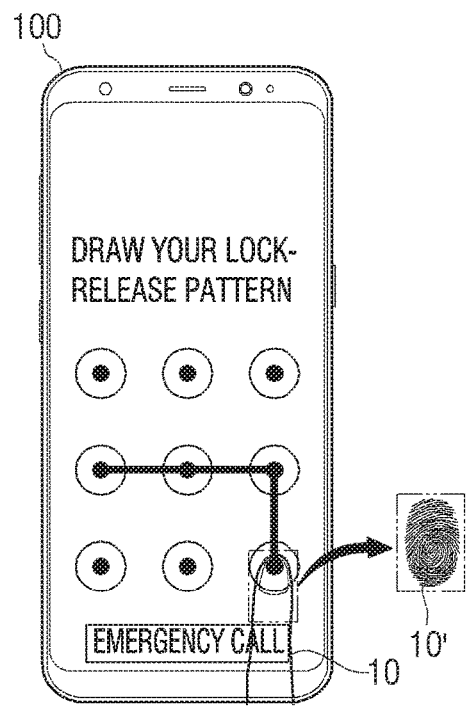
FIGS. 10A and 10B are diagrams each for explaining an example in which an electronic apparatus according to various embodiments of the disclosure performs a user re-authentication implicitly or explicitly while user authentication information is input when a user authentication failure occurs a predetermined number of times or more.
Figure 10B:
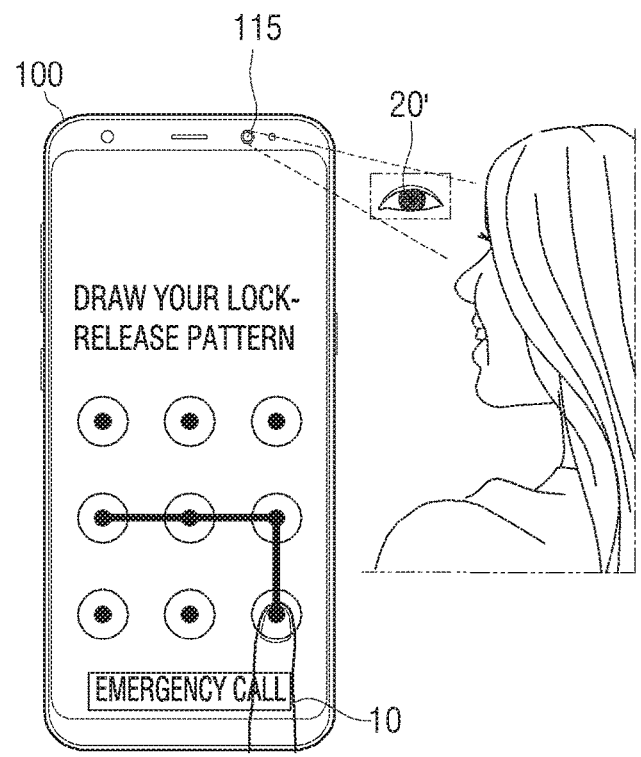

FIGS. 10A and 10B assume that the electronic apparatus 100 performs the user fingerprint or iris recognition, while the user inputs a pattern which is the user authentication information.

Referring to FIG. 10A, while the user draws a touch pattern on the screen of the electronic apparatus 100 with the user finger 10 (while the user inputs the user authentication information), the electronic apparatus 100 may recognize the fingerprint 10' of the user finger 10.

Here, the electronic apparatus 100 may not notify the user that the user fingerprint recognition is performed, and may perform the user re-authentication based on the recognized user fingerprint 10'.

Referring to FIG. 10B, when the user draws the pattern on the screen of the electronic apparatus 100 with the user finger 10 (while the user inputs the user authentication information), the electronic apparatus 100 may recognize the user iris 20' by the camera 115.

Here, the electronic apparatus 100 may not notify the user that the user iris recognition is performed, and may perform the user re-authentication based on the recognized user iris 20'.

In addition, the processor 120 may not switch the electronic apparatus 100 to be in the lock release state and keep the electronic apparatus 100 to be in the lock state in a situation where the user re-authentication failure occurs.

To the contrary, the processor 120 may switch the electronic apparatus 100 to be in the lock release state when the user re-authentication is successful based on the user biometric information, even though the user authentication is not successful.

As illustrated in FIGS. 10A and 10B, in a situation where the processor 120 performs the user re-authentication (the user biometric authentication) implicitly, when the user re-authentication failure occurs the predetermined number of times or more or the predetermined time period or more, the processor 120 may perform the user re-authentication explicitly.

In this case, even though the user authentication based on the input user authentication information is successful, the processor 120 may not switch the electronic apparatus 100 immediately to be in the lock release state, and may perform the user re-authentication explicitly.

Figure 11:
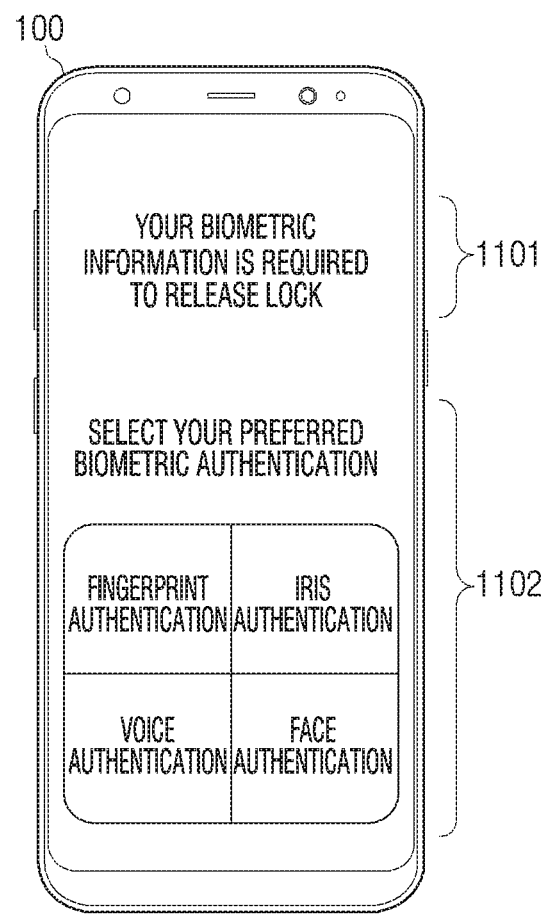
FIG. 11 is a diagram for explaining an example in which an electronic apparatus according to an embodiment of the disclosure performs a user re-authentication implicitly or explicitly while user authentication information is input when a user authentication failure occurs a predetermined number of times or more.

In this case, as illustrated in FIG. 11, the electronic apparatus 100 may display at least one of a UI 1101 requesting the user to input the user biometric authentication and a UI 1102 requesting the user to select the user biometric authentication method. Also, the electronic apparatus 100 may perform the user biometric authentication using the same method as illustrated in FIGS. 7A and 7B, FIG. 8 or the like.

Here, when the user re-authentication is successful, the processor 120 may switch the electronic apparatus 100 to be in the lock release state; however, when the user re-authentication failure occurs, the processor 120 may keep the electronic apparatus 100 to be in the lock state.

Each of the above embodiments, in which the processor 120 performs the user re-authentication depending on the number of the user authentication failure, may be performed in combination with some or all of the embodiments.

For example, in a situation where the user authentication failure occurs less than a predetermined first number of times, when the user authentication thereafter is successful (lock release), the processor 120 may not perform the user re-authentication. The processor 120 may perform the user re-authentication implicitly and/or explicitly even though the user authentication is successful (lock release) after the user authentication failure occurs the predetermined first number of times or more and less than a predetermined second number of times. Here, when the user re-authentication failure occurs, the processor 120 may switch the electronic apparatus 100 to be in the lock state. When the user authentication failure occurs the predetermined second number of times or more, the processor 120 may perform the user re-authentication based on the user biometric information input while the user inputs the user authentication information. The processor 120 may then switch the electronic apparatus 100 to be in the lock release state only when the user re-authentication is successful, and is not limited thereto.

The processor 120 may perform the user re-authentication at a different cycle depending on the number of the user authentication failure.

For example, in a situation where the user authentication failure occurs less than a predetermined number of times, when the user authentication thereafter is successful (lock release), the processor 120 may not perform the user re-authentication. In a situation where the user authentication failure occurs the predetermined number of times or more, the processor 120 may perform the user re-authentication implicitly and/or explicitly based on a predetermined cycle even after the user authentication is successful (lock release).

As another example, in a situation where the user authentication failure occurs less than a predetermined first number of times, when the user authentication thereafter is successful (lock release), the processor 120 may perform the user re-authentication implicitly based on a first cycle. In a situation where the user authentication failure occurs the predetermined first number of times or more and less than a predetermined second number of times, when the user authentication thereafter is successful (lock release), the processor 120 may perform the user re-authentication implicitly based on a second cycle which is smaller than the first cycle. When the user authentication failure occurs the predetermined second number of times or more, the processor 120 may perform the user re-authentication explicitly.

FIG. 12 is a block diagram illustrating a detailed configuration of an electronic apparatus according to one of various embodiments of the disclosure.

In addition to the input 110 and the processor 120, the electronic apparatus 100 may further include at least one of a storage 130, a communicator 140 (e.g., a transceiver), an output 150, and an input/output port 160.

The input 110 may include a touch sensor 111, a button input 112, a microphone 113, a fingerprint sensor 114, a camera 115 and the like for obtaining user commands or information.

The touch sensor 111 is configured to sense a user touch point and may be implemented on at least a partial surface of the electronic apparatus 100. The touch sensor 111 may be implemented as a pressure sensitive or capacitive touch sensor.

The touch sensor 111 may be implemented as a touch panel coupled to a display 151 of the electronic apparatus 100 or in combination with at least one button included in the button input 112.

The user may touch a specific point of the electronic apparatus 100 which includes the touch sensor 111 to input the user commands or information into the electronic apparatus 100.

The user may touch a specific object displayed on the display 151 to input the user commands or information corresponding to the specific object to the electronic apparatus 100. The user may also input the user authentication information through the touch sensor 111.

The button input 112 may include at least one button provided on a portion of the electronic apparatus 100. The user may press a specific button or touch a button including the touch sensor 111 to input the user commands or information to the electronic apparatus 100. In addition, the user may input the user authentication information through the button input 112.

The microphone 113 is configured to obtain the user commands or information in the form of voice. The microphone 113 may include an analog-to-digital converter converting an analog signal to a digital signal.

Through the microphone 113 obtaining voice, the user may input the user commands or information into an electronic apparatus using user voice. Here, the user voice input through the microphone 113 is recognized specifically, and a text corresponding to the user voice may thus be used as the user authentication information. Alternatively, the user voice input through the microphone 113 is recognized, and a signal characteristic value of the user voice may thus be used as the user biometric information.

The fingerprint sensor 114 is configured to recognize the user fingerprint. The fingerprint sensor 114 may be implemented as being coupled to the display 151 and may be implemented on a certain surface of the electronic apparatus 100 as not being coupled to the display 151.

The processor 120 may perform the user re-authentication based on a comparison result between the user fingerprint recognized through the fingerprint sensor 114 and the pre-stored user fingerprint each other.

The camera 115 is configured to take a picture or to capture a video. The electronic apparatus 100 may include only one camera 115, or may include one or more cameras on the front and back of the electronic apparatus 100, respectively, when the electronic apparatus 100 is a mobile phone or a smartphone.

The electronic apparatus 100 may recognize the user iris or face through the camera 115. Alternatively, even though not illustrated in FIG. 12, a separate user iris recognition sensor (not illustrated) may be included in the electronic apparatus 100 in addition to the camera.

The processor 120 may perform the user re-authentication based on the recognized user iris information through the camera 115 or the separate user iris recognition sensor (not illustrated).

The processor 120 may include a random access memory (RAM, not illustrated), a read only memory (ROM, not illustrated), a central processing unit (CPU, not illustrated), a graphic processing unit (GPU, not illustrated), a system bus (not illustrated) and the like, and may execute an operation or data processing related to a control of other component included in the electronic apparatus 100.

The storage 130 is configured to store a command or data related to an operating system (OS) controlling an overall operation of components of the electronic apparatus 100 and a component of the electronic apparatus 100.

To this end, the storage 130 may be implemented as a nonvolatile memory (e.g., hard disk, solid state drive (SSD), flash memory), volatile memory and the like.

The storage 130 may store user information of the electronic apparatus 100. In detail, the processor 120 may obtain the user authentication information used for the user authentication and the user biometric information used for the user re-authentication in advance from the user and may store the information in the storage 130.

Thereafter, the processor 120 may perform the user authentication and/or user re-authentication information based on a comparison result between the user authentication information and/or the user biometric information input from the user and the stored user authentication information and/or the stored user biometric information, respectively.

The storage 130 may also include information on the user biometric authentication notification or UI needed to perform the user biometric authentication explicitly.

The communicator 140 is configured to enable the electronic apparatus 100 to perform communications with various types of external devices depending on various types of communication manners. The communicator 140 may include a WiFi chip (not illustrated), a Bluetooth chip (not illustrated) and the like. The communicator 140 may perform data communication with various external devices in a wireless or wired manner.

When performing data communication with an external device (not illustrated) in a wireless communication manner, the communicator 140 may include at least one of a WiFi direct communication module, a Bluetooth module, an infrared data association (IrDA) module, a near field communication (NFC) module, a Zigbee module, a cellular communication module, a third generation (3G) mobile communication module, a fourth generation (4G) mobile communication module and a fourth generation long term evolution (LTE) communication module.

In a previous embodiment as illustrated in FIG. 2, the processor 120 performs the user authentication based on the user authentication information input through the input 110. However, the processor 120 may also obtain the input user authentication information in the external device (not illustrated) from the external device (not illustrated) through the communicator 140 and may perform the user authentication based on the obtained user authentication information.

In addition, the processor 120 may obtain the input user biometric information in the external device (not illustrated) through the communicator 140 and perform the user re-authentication based on the obtained user biometric information.

Even though not illustrated in FIG. 12, the communicator 140 may include a position sensor (not illustrated) such as a global positioning system (GPS) sensor. The position sensor (not illustrated) is a device estimating a current position of the electronic apparatus 100.

Here, the processor 120 may obtain position information of the electronic apparatus 100 from the position sensor (not illustrated).

In this case, the processor 120 may obtain the position information of the electronic apparatus 100 from the position sensor (not illustrated) and store the information in advance in the storage 130 while the electronic apparatus 100 is in use. For example, the processor 120 may obtain the position information from the position sensor (not illustrated) only while the electronic apparatus 100 is in the lock release state and store the information in the storage 130 in advance.

Thereafter, in a situation where the user inputs the user authentication information and the processor 120 performs the user authentication, the processor 120 may obtain the position information of the electronic apparatus 100 from the position sensor (not illustrated), compare the information with pre-stored position information each other and perform the user re-authentication based on a comparison result.

In detail, the processor 120 may perform the user re-authentication in the following situations where: the obtained position information does not match the pre-stored position information at all; the obtained position information differs by a predetermined distance or more when compared with the closest position information among the pre-stored position information; and a country corresponding to the obtained position information does not match one or more countries corresponding to the pre-stored position information.

An output 150 is configured to provide the user with information stored in the electronic apparatus 100 visually or audibly.

The output 150 may include a display 151, a speaker 152 and the like, and may include a vibrating motor (not illustrated). The vibrating motor (not illustrated) is configured to vibrate based on commands or signals transmitted from the processor 120 or the communicator 140.

The display 151 is configured to display an image under a control of the processor 120. To this end, the display 151 may be implemented as a liquid crystal display (LCD), a plasma display panel (PDP), an organic light emitting diodes (OLED), a transparent OLED (TOLED) or the like. When implemented as the LCD, the display 151 may include a driving circuit (not illustrated), a backlight unit (not illustrated) and the like together, which may be implemented in a form of an a-si thin film transistor (TFT), low temperature poly silicon (LTPS), a thin film transistor (TFT), an organic TFT (OTFT) or the like.

The display 151 may display a text and an image indicating a process or result of the user authentication and/or the user re-authentication under the control of the processor 120; and when performing the user biometric authentication explicitly, the display 151 may also display a related notification or UI.

In addition, the display 151 may display an image included in a broadcast signal obtained through a broadcast obtainer (not illustrated) of the electronic apparatus 100, an image included in a signal obtained through the communicator 140, an image input through the input 110, an image included in an image file stored in the storage 130, an image included in a signal obtained externally through an input/output port 160 and the like.

The speaker 152 is configured to output a specific voice under the control of the processor 120.

The speaker 152 may provide the UI indicating the process or result of the user authentication and/or the user re-authentication in the form of voice under the control of the processor 120; and when performing the user biometric authentication explicitly, the speaker 152 may also provide a related auditory notification or UI.

In addition, the speaker 152 may output voice included in the broadcast signal obtained through the broadcast obtainer (not illustrated) of the electronic apparatus 100, voice included in the signal obtained through the communicator 140, voice input through the microphone 113, voice included in an audio file stored in the storage 130, voice included in the signal obtained externally through the input/output port 160 or the like.

The electronic apparatus 100 may obtain and transmit a signal for an image and/or voice externally through the input/output port 160. In addition, the electronic apparatus 100 may obtain or provide power externally through the input/output port 160.

To this end, the input/output port 160 may be implemented as a wired port such as a high-definition multimedia interface (HDMI) port, a display port, a red-green-blue (RGB) port, a digital visual interface (DVI) port, a thunderbolt, a component port or the like. Alternatively, the input/output port 160 may be implemented as a port for wireless communication such as WiFi or Bluetooth communication.

The input/output port 160 may include an earphone or headphone connection terminal. In this case, the electronic apparatus 100 may transmit, to a connected earphone or headphone, a signal including voice included in a voice file stored in the storage 130, voice included in a signal obtained through the broadcast obtainer or the communicator 140 of the electronic apparatus 100 or the like.

In addition, the electronic apparatus 100 may transmit, to the connected earphone or headphone, a signal including voice corresponding to the UI indicating the process or result of the user authentication and/or the user re-authentication, voice corresponding to the related notification or UI when performing the user biometric authentication explicitly or the like.

Even though not illustrated in FIG. 12, the electronic apparatus 100 may further include the broadcast obtainer (not illustrated), a power supplier (not illustrated) and the like.

The broadcast obtainer (not illustrated) may be implemented to include a component such as a tuner (not illustrated), a demodulator (not illustrated), an equalizer (not illustrated) and the like to obtain a broadcast content transmitted from a broadcasting station.

The power supplier (not illustrated) may be configured to supply the power to components of the electronic apparatus 100. The power supplier (not illustrated) may supply the power to the components of the electronic apparatus 100 using the power supplied externally through the input/output port 160. In addition, the power supplier (not illustrated) may include a battery, and may store the power supplied externally in the battery and supply the power to the components of the electronic apparatus 100.

Hereinafter, a controlling method of an electronic apparatus according to the disclosure is described.

Figure 13:
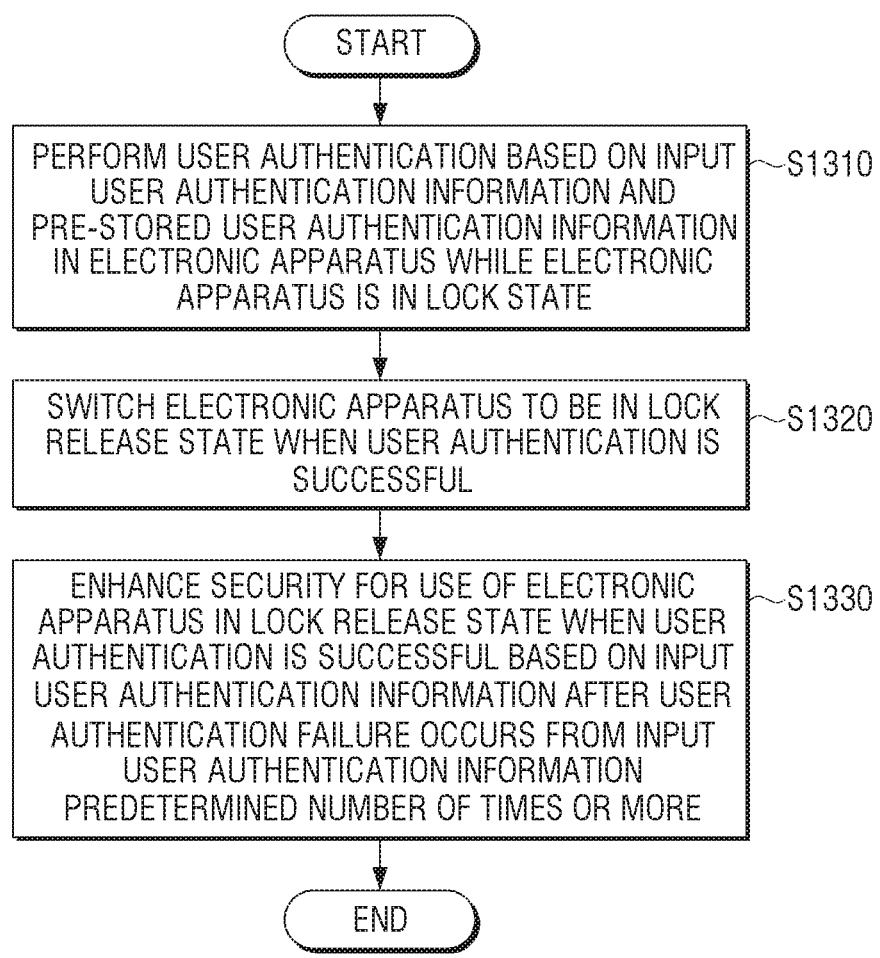
FIG. 13 is a flow chart for explaining a controlling method of an electronic apparatus according to an embodiment of the disclosure.

FIG. 13 is a flow chart for explaining a controlling method of an electronic apparatus according to an embodiment of the disclosure.

Referring to FIG. 13, the controlling method may perform a user authentication (S1310) based on input user authentication information and pre-stored user authentication information in the electronic apparatus while the electronic apparatus is in a lock state.

When the user authentication is successful, the method may include switching the electronic apparatus 100 to be in a lock release state (S1320). For example, when the input user authentication information matches the pre-stored user authentication information, the electronic apparatus may be switched to be in the lock release state.

Here, the method may include enhancing security for use of the electronic apparatus in a lock release state (S1330) when the user authentication is successful based on the user authentication information input after a user authentication failure occurs from the input user authentication information a predetermined number of times or more. In detail, in the enhancing of the security for use of the electronic apparatus, a user re-authentication may be performed depending on the number of the user authentication failure occurring because the input user authentication information does not match the pre-stored user authentication information. In this case, the user authentication failure may indicate that the user authentication failure occurs because the input user authentication information does not match the pre-stored user authentication information.

The user authentication information may include a predetermined pattern or a password, and user biometric information may include user fingerprint or user iris.

For performing the user re-authentication, the user biometric information may be obtained, and the user re-authentication may be performed based on the input user biometric information. Here, when the input user biometric information matches pre-stored user biometric information, the user re-authentication may be successful.

For example, in a situation where the user authentication failure occurs the predetermined number of times or more, when the user authentication is successful based on the user authentication information input thereafter and thus the electronic apparatus is switched to be in the lock release state, the user re-authentication may be performed even after the electronic apparatus is switched to be in the lock release state.

In detail, in a situation where the input user authentication information matches the pre-stored user authentication information and thus the electronic apparatus is switched to be in the lock release state, the user re-authentication may be performed even after the electronic apparatus is switched to be in the lock release state when the user authentication failure, in which an incorrect user authentication information is input, occurs the predetermined number of times or more until the user inputs the user authentication information matching the pre-stored the user authentication information. Here, when the user re-authentication is successful, the electronic apparatus may be kept to be in the lock release state; however, the electronic apparatus may be switched back to be in the lock state when the user re-authentication failure occurs.

In the enhancing of the security for use of the electronic apparatus, the user re-authentication may be performed on condition that a predetermined application is executed after the electronic apparatus is switched to be in the lock release state. For example, the user re-authentication may be performed when a predetermined application is executed in a situation where the electronic apparatus is in the lock release state.

Here, the predetermined application may include at least one of an application set to perform an automatic user login or an application storing user personal information, among applications providing a service requiring a user login.

Meanwhile, in a situation where the user authentication failure occurs less than the predetermined number of times, when the user authentication is successful and thus the electronic apparatus is switched to be in the lock release state, on the contrary to the above, the security for use of the electronic apparatus may not be enhanced.

In detail, before the input user authentication information matches the pre-stored the user authentication information to switch the electronic apparatus to be in the lock release state, in a situation where the user authentication failure occurs one or more times, but less than the predetermined number of times, the user re-authentication may not be performed after the electronic apparatus is switched to be in the lock release state.

Meanwhile, the controlling method may further include enhancing security for lock of the electronic apparatus in the lock state in a situation where the user authentication failure occurs the predetermined number of times or more. That is, the electronic apparatus may be switched to be in the lock release state not whenever the user authentication is successful based on the user authentication information, but only when the user re-authentication is successful based on the user biometric information.

In detail, the user biometric information may be obtained and the user re-authentication may be performed based on the input user biometric information while the user inputs the user authentication information to switch the electronic apparatus to be in the lock release state in a situation where the user authentication failure occurs the predetermined number of times or more.

In this case, in a situation where the user authentication failure occurs the predetermined number of times or more, the obtaining of the user biometric information itself may be made when the user inputs user authentication information to succeed in the user authentication. For example, in a situation where a touch pattern needs to be input to perform the user authentication, the user fingerprint may be recognized while the user touches the electronic apparatus to input the touch pattern.

Alternatively, while the user inputs the user authentication information through a touch operation, a front image may be obtained when the electronic apparatus captures the image, and the user iris or face may be recognized from the obtained image.

When the user re-authentication is successful, the electronic apparatus may be switched to be in the lock release state regardless whether or not the user authentication is successful; and the electronic apparatus may be kept to be in the lock state when the user re-authentication failure occurs regardless whether or not the user authentication is successful.

The above-described embodiments in which the user re-authentication is performed depending on the number of the user authentication failure may be combined to some or all of the embodiments to be derived in various embodiments.

FIGS. 14 to 17 are algorithms each for explaining a controlling method of an electronic apparatus according to one of various embodiments of the disclosure.

Figure 14:
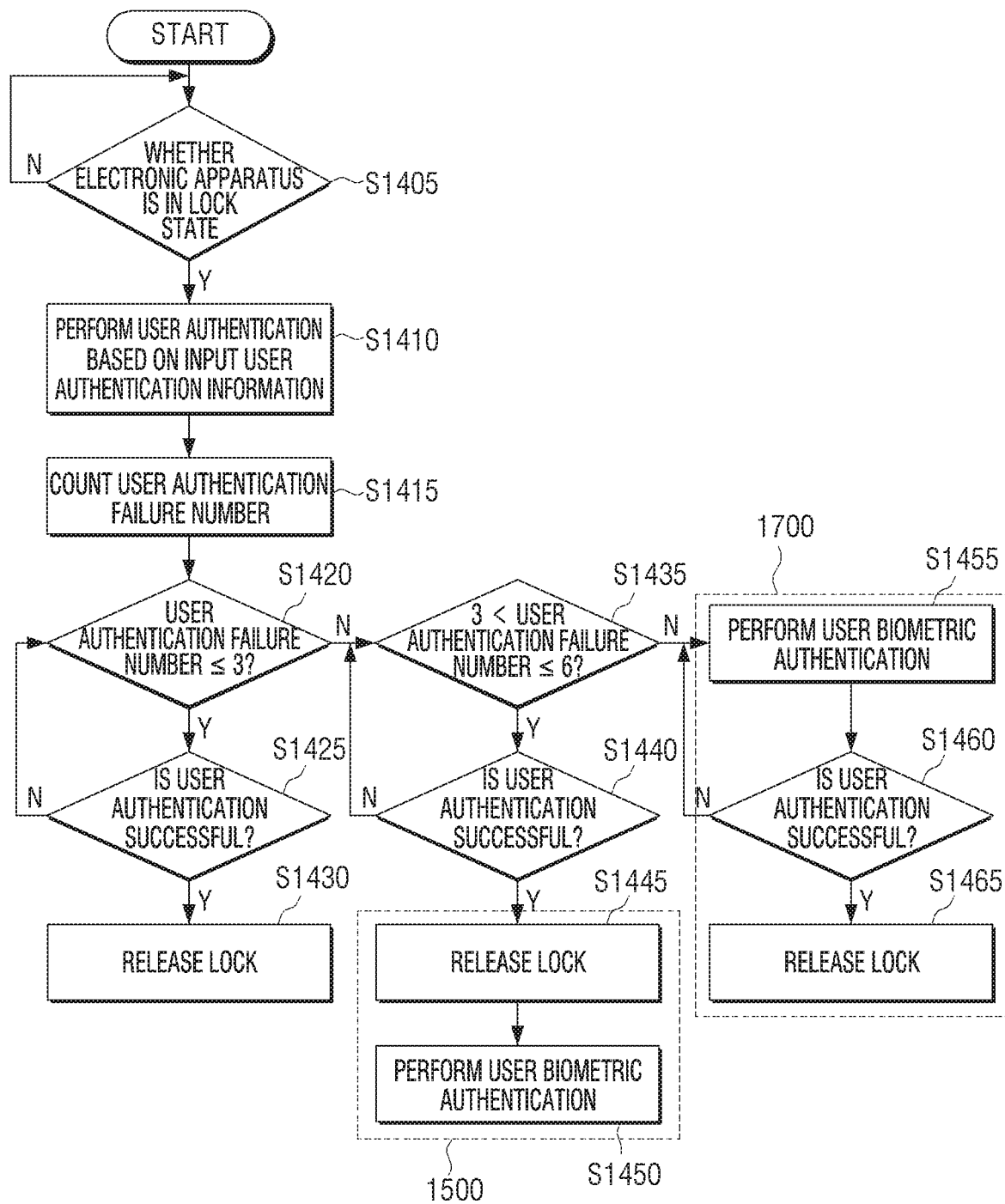
FIG. 14 is an algorithm for explaining a controlling method of an electronic apparatus according to an embodiment of the disclosure.

Referring to FIG. 14, in a situation where the electronic apparatus is in the lock state (S1405—Y), the user authentication may be performed based on the input user authentication information (S1410).

Here, the number of the user authentication failure (S1415) occurring because the user authentication information does not match the pre-stored the user authentication information may be identified to determine whether or not the user authentication failure occurs less than the predetermined number of times. Referring to FIG. 14, it is determined whether or not the user authentication failure occurs three times or less (S1420). Here, the three times is an example, and is not limited thereto.

In a situation where the user authentication failure occurs three times or less (S1420—Y), it is identified whether or not the user authentication is successful (S1425). Here, when the user authentication is successful (S1425—Y), the electronic apparatus may be switched to be in the lock release state (S1430).

In a situation where the user authentication failure consecutively occurs (S1425—N) and thus the user authentication failure occurs more than three times (S1420—N), it may be identified whether or not the user authentication failure occurs six times or less (S1435). Here, the six times is an example, and not limited thereto.

In a situation where the user authentication failure occurs six times or less (S1435—Y), it is identified whether or not the user authentication is successful (S1440). Here, when the user authentication is successful (S1440—Y), the electronic apparatus may be switched to be in the lock release state (S1445). However, even after the electronic apparatus is switched to be in the lock release state, the user re-authentication, i.e. the user biometric authentication, may be performed (S1450). Here, the user biometric authentication failure occurs, the electronic apparatus may be switched back to be in the lock state.

In a situation where the user authentication failure consecutively occurs (S1440—N) and thus the user authentication failure occurs more than six times (S1435—N), the user biometric authentication may be performed immediately (S1455). Here, when the user authentication is successful (S1460—Y), the electronic apparatus may be switched to be in the lock release state (S1465).

The algorithm of FIG. 14 described above may be summarized as follows. In a situation where the user authentication failure occurs three times or less and the user authentication thereafter is successful, the electronic apparatus is switched to be in the lock release state and the user biometric authentication is not further performed. In a situation where the user authentication failure occurs more than three times and six times or less and the user authentication thereafter is successful, the electronic apparatus is switched to be in the lock release state and the user biometric authentication is further performed (S1500). In a situation where the user authentication failure occurs seven times or more, only when the user biometric authentication is successful, the electronic apparatus is switched to be in the lock release state regardless whether or not the user authentication is successful (S1700).

As such, whether or not to perform the user biometric authentication after the electronic apparatus is switched to be in the lock release state may depend on the number of the user authentication failure.

In addition, depending on the number of the user authentication failure, a condition may be enhanced for switching the electronic apparatus to be in the lock release state. In detail, the condition for the lock release may be changed from the user authentication based on the input user authentication information to the user biometric authentication based on the user biometric information.

Figure 15:
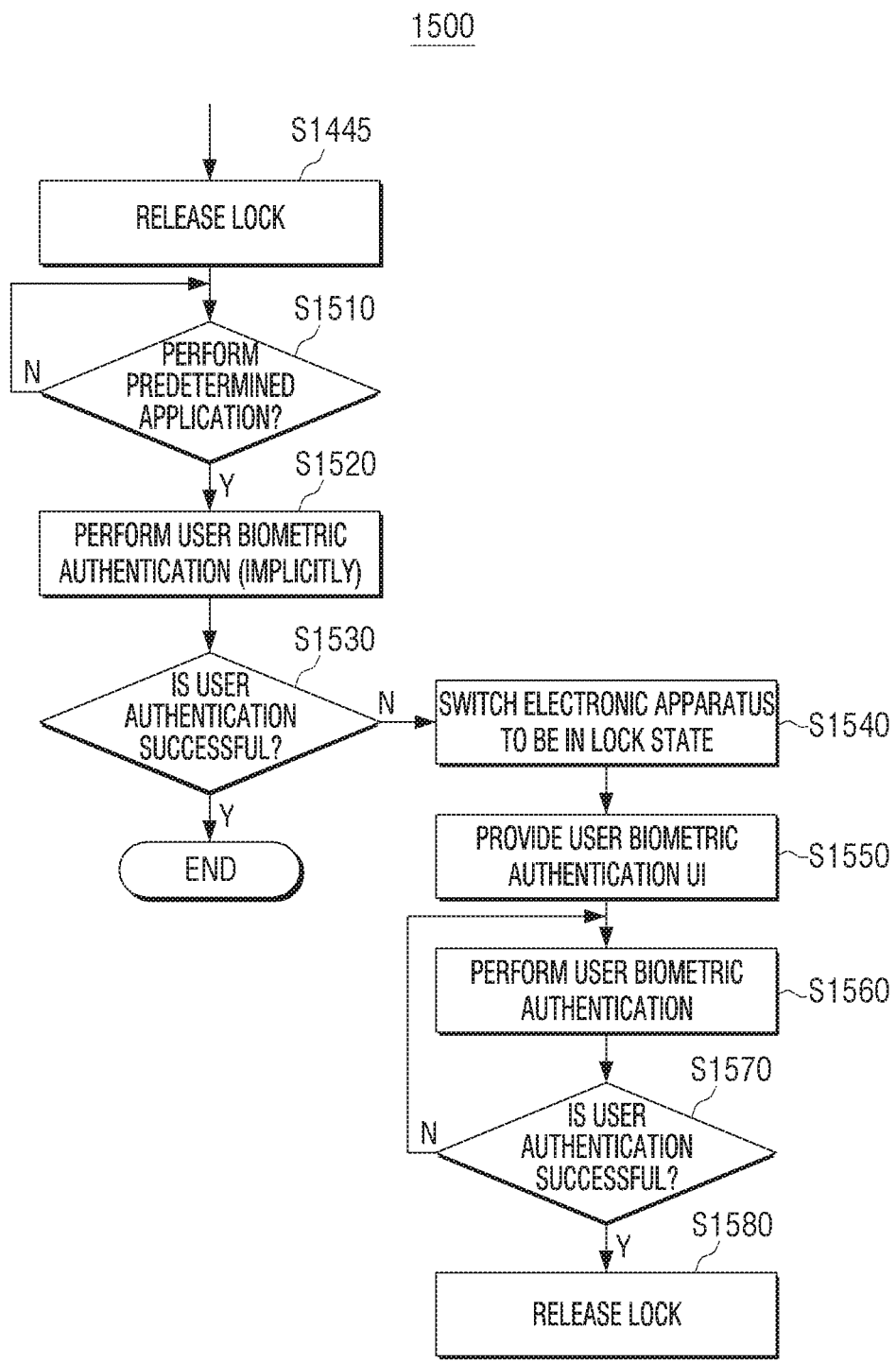
FIG. 15 is an algorithm for explaining a controlling method of an electronic apparatus according to an embodiment of the disclosure.

FIG. 15 is an algorithm for explaining an example of a specific process in which the user authentication failure occurs more than the predetermined first number of times (three times in FIG. 14) and the predetermined second number of times or less (six times in FIG. 14), and the user authentication thereafter is successful, the user biometric authentication is performed (S1500) after the electronic apparatus is switched to be in the lock release state.

Referring to FIG. 15, in a situation where the user authentication failure occurs more than the predetermined first number of times and the predetermined second number of times or less, when the user authentication thereafter is successful and thus the electronic apparatus is switched to be in the lock release state (S1445), the user biometric authentication may be performed depending on whether or not the predetermined application is executed. Here, the predetermined application may be an application set to perform an automatic user login, an application storing user personal information or the like, among applications providing a service requiring a user login.

In a situation where the electronic apparatus is switched to be in the lock release state and the predetermined application thereafter is executed (S1510—Y), the user biometric authentication may be performed implicitly (S1520). That is, the user biometric authentication may be performed without a separate notification or UI indicating that the user biometric authentication is performed.

In this case, when the user biometric authentication is successful (S1530—Y), the electronic apparatus may be kept to be in the lock release state.

To the contrary, when the user biometric authentication is performed implicitly and thus the user biometric authentication failure occurs (S1530—N), the electronic apparatus may be switched back to be in the lock state (S1540) and the user biometric authentication may then be performed explicitly.

In detail, when a user biometric authentication UI is provided (S1550) and the user inputs the user biometric information based on the UI, the user biometric authentication may then be performed based on the input user biometric information (S1560). Here, the user biometric authentication UI may be a UI requesting the user to input the user biometric information and/or informing the user how to input the user biometric information.

When the user biometric authentication is successful (S1570—Y), the electronic apparatus may be switched to be in the lock release state (S1580); and when the user biometric authentication failure occurs (S1570—N), the electronic apparatus may be kept to be in the lock state.

Figure 16:
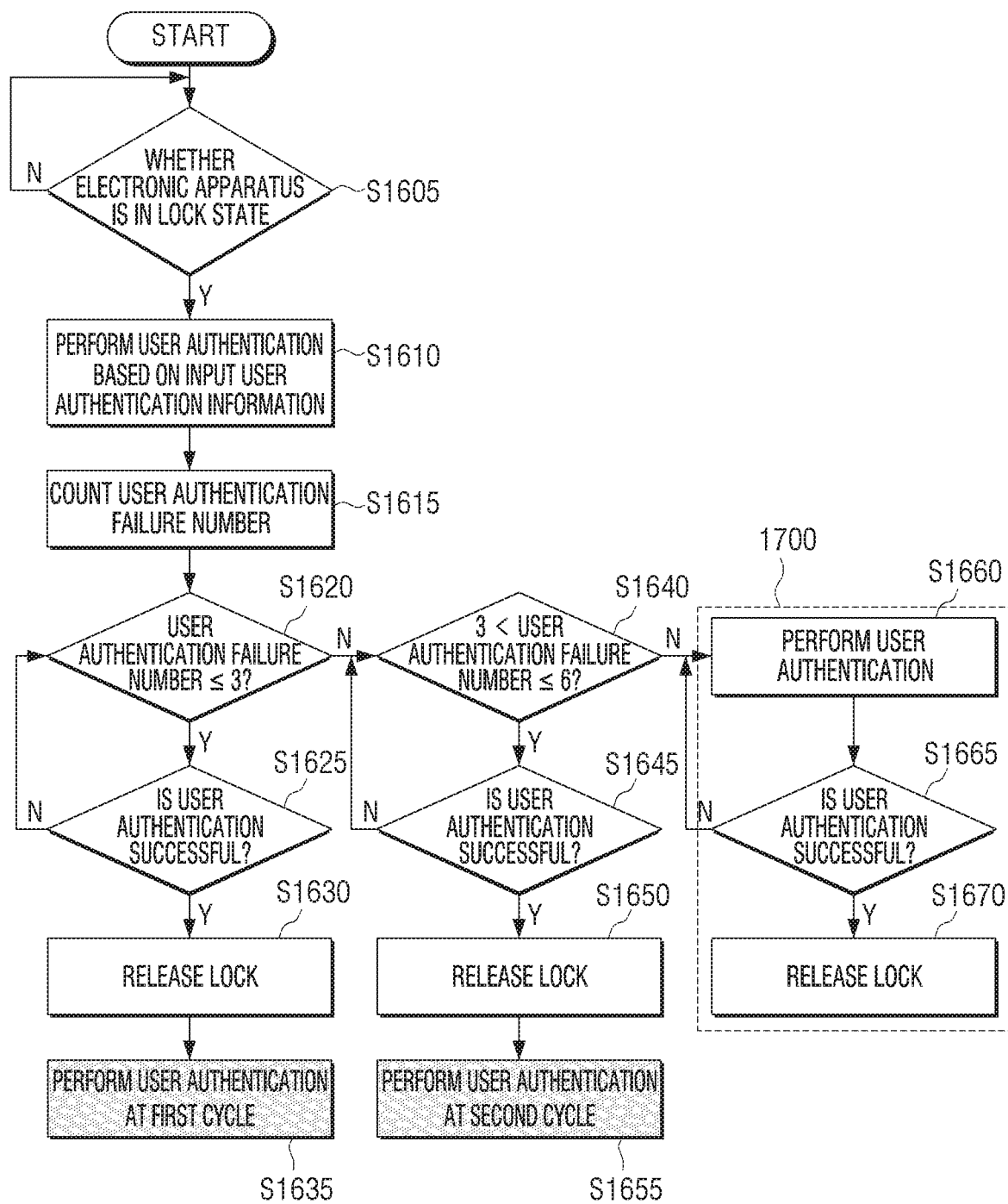
FIG. 16 is an algorithm for explaining a controlling method of an electronic apparatus according to an embodiment of the disclosure.

FIG. 16 illustrates another embodiment in which the user re-authentication, i.e. the user biometric authentication, may be performed depending on the number of the user authentication failure.

Referring to FIG. 16, most operations are the same as those illustrated in FIG. 14. However, operations S1635 and S1655 are different from those illustrated in FIG. 14.

That is, according to an embodiment in FIG. 16, even though the user authentication is successful and thus the electronic apparatus is switched to be in the lock release state, the user biometric authentication may be performed. Here, the user biometric authentication may be performed at a different cycle depending on the number of the user authentication failure occurring until the user authentication is successful.

In detail, as the number of user authentication failure increases until the user authentication is successful, the user biometric authentication may be performed more often. That is, in FIG. 16, the second cycle in S1655 may be shorter than the first cycle in S1635. As noted above, operations S1605-S1630, S1640-S1650, and S1660-S1670 are similar to the operations of S-1405-S1430, S1435-S1445, and S1455-S1465 shown in FIG. 14, and therefore the description thereof will be omitted.

Figure 17:
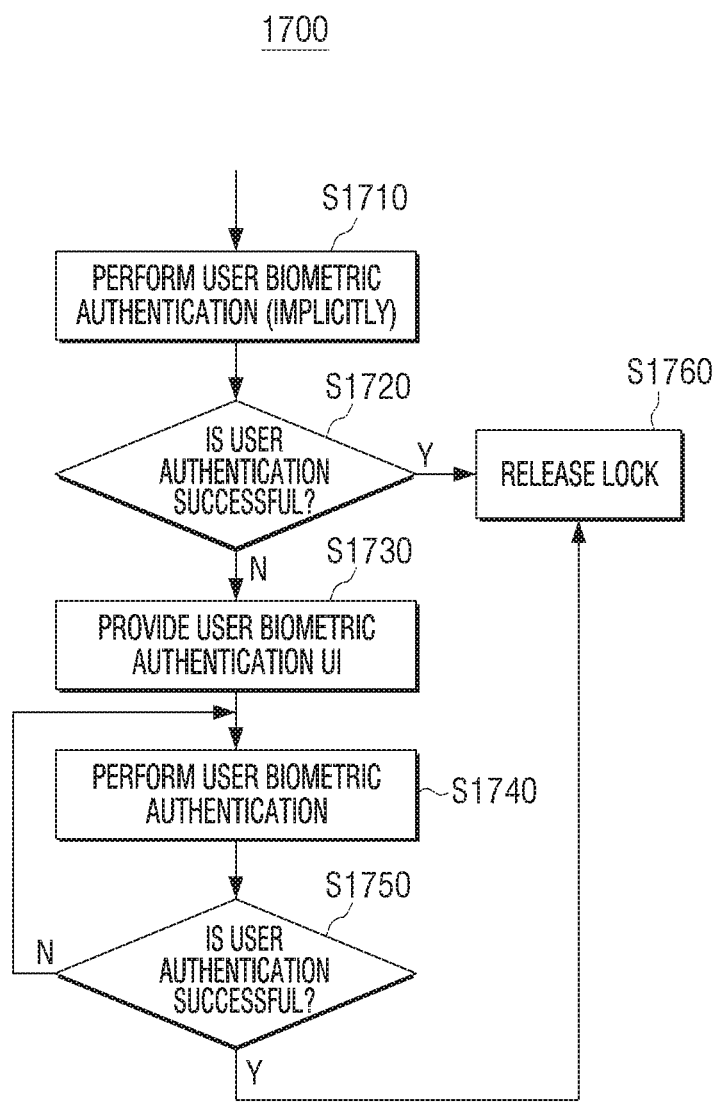
FIG. 17 is an algorithm for explaining a controlling method of an electronic apparatus according to an embodiment of the disclosure.

FIG. 17 is an algorithm for explaining an embodiment in which in a situation where the user authentication failure occurs more than the predetermined number of times, the user biometric authentication is performed immediately (S1700).

Referring to FIG. 17, in a situation where the user authentication failure occurs more than the predetermined number of times, the user biometric authentication may be performed implicitly (S1710). In detail, in a situation where the user authentication failure occurs more than the predetermined number of times and the user authentication is yet to be successful, the user biometric authentication may be performed implicitly.

In this case, the user biometric authentication may be performed implicitly while the user further inputs the user authentication information to perform the user authentication. For example, the user fingerprint, which is the user biometric information, may be recognized based on the user's finger touch to input the user authentication information; alternatively, the user iris, which is the user biometric information, may be recognized by capturing the user's eye when the user gazes at the electronic apparatus to input the user authentication information. Thereafter, the user biometric authentication may be performed based on the recognized user fingerprint or iris.

In a situation where the user biometric authentication is performed implicitly, and thus the user biometric authentication is successful (S1720—Y), the electronic apparatus is switched to be in the lock release state (S1760). Here, the electronic apparatus is switched to be in the lock release state regardless whether or not the user authentication is successful.

To the contrary, in a situation where the user biometric authentication is performed implicitly, and thus the user biometric authentication failure occurs (S1720—N), the user biometric authentication may then be performed explicitly.

In detail, when the user biometric authentication UI may be provided (S1730) and the user inputs the user biometric information following the provided UI, the user biometric authentication may be performed (S1740).

In a situation where the user biometric authentication is performed explicitly, and thus the user biometric authentication is successful (S1750—Y), the electronic apparatus is switched to be in the lock release state. To the contrary, in a situation where the user biometric authentication failure occurs (S1750—N), the electronic apparatus is kept to be in the lock state regardless whether or not the user authentication is successful.

Embodiments of the controlling method according to the disclosure as specifically described in FIGS. 13 to 17 may be performed by the electronic apparatus 100 illustrated or explained in FIG. 2 or 12.

In addition, the embodiments of the controlling method according to the disclosure may be implemented in particular software and executed by the processor 120 of the electronic apparatus 100, and thus the electronic apparatus 100 may perform an operation corresponding to the controlling method.

In addition, the embodiments of the controlling method according to the disclosure may be implemented by a system (not illustrated) including the electronic apparatus 100 and one or more external devices (not illustrated).

Meanwhile, the various embodiments in the disclosure described above may be implemented in a computer or a computer readable recording medium using software, hardware or a combination of software and hardware.

According to a hardware implementation, the embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and electric units for performing other functions.

In some cases, the embodiments described in the disclosure may be implemented as the processor 120 itself. According to a software implementation, the embodiments such as procedures and functions described in the disclosure may be implemented as separate software modules. Each of the software modules may perform one or more functions and operations described in the disclosure.

Meanwhile, computer instructions for performing processing operations of the electronic apparatus 100 according to the various embodiments in the disclosure described above may be stored in a non-transitory computer-readable medium. The computer instructions stored in the non-transitory computer-readable medium allow a specific device to perform the processing operations of the electronic apparatus 100 according to the various embodiments described above when executed by a processor of the specific device.

The non-transitory computer readable medium does not refer to a medium that temporarily stores data such as a register, a cache, a memory or the like, but refers to a medium that semi-permanently stores data and is readable by a device. In detail, various applications or programs described above may be provided while being stored in the non-transitory computer readable medium such as a compact disk (CD), a digital versatile disk (DVD), a hard disk, a Blu-ray disk, a universal serial bus (USB), a memory card, a read only memory (ROM) or the like.

While the disclosure has been shown and described with reference to various embodiments thereof, it will be understood by those skilled in the art that various changes in form and details may be made therein without departing from the the spirit and scope of the disclosure as defined by the appended claims and their equivalents.

What is claimed is:

1. An electronic apparatus comprising:
a sensor; and
at least one hardware processor configured to:
perform a user authentication based on user authentication information input through the sensor and user authentication information pre-stored in the electronic apparatus while the electronic apparatus is in a lock state,
based on the user authentication being successful, switch the electronic apparatus to be in a first lock release state,
perform a user re-authentication based on user biometric information after the user authentication fails a predetermined number of times or more,
based on the user re-authentication based on the user biometric information being successful, switch the electronic apparatus to be in a second lock release state, and
based on the electronic apparatus being in the second lock release state, perform another user re-authentication based on the user biometric information.

2. The electronic apparatus of claim 1,
wherein the user authentication information comprises a predetermined pattern or a password, and
wherein the user biometric information comprises a user fingerprint or a user iris.

3. The electronic apparatus of claim 1, wherein the at least one hardware processor is further configured to switch the electronic apparatus to be in the lock state based on a failure of the another user re-authentication occurring.

4. The electronic apparatus of claim 1, wherein the at least one hardware processor is further configured to perform the another user re-authentication when a predetermined application is executed in a situation where the electronic apparatus is in the second lock release state.

5. The electronic apparatus of claim 4, wherein the predetermined application comprises at least one of an application set to perform an automatic user login or an application storing user personal information, among applications providing a service requiring a user login.

6. The electronic apparatus of claim 1, wherein the at least one hardware processor is further configured to:
obtain the user biometric information from the sensor, and
based on a failure of the user authentication occurring the predetermined number of times or more, perform the user re-authentication using the obtained user biometric information while a user inputs the user authentication information to switch the electronic apparatus to be in the second lock release state.

7. The electronic apparatus of claim 6, wherein the at least one hardware processor is further configured to keep the electronic apparatus to be in the lock state based on a failure of the user re-authentication occurring.

8. A controlling method of an electronic apparatus, the controlling method comprising:
performing a user authentication based on user authentication information input to the electronic apparatus and user authentication information pre-stored in the electronic apparatus while the electronic apparatus is in a lock state;
based on the user authentication being successful, switching the electronic apparatus to be in a first lock release state;
performing a user re-authentication based on user biometric information after the user authentication fails a predetermined number of times or more;
based on the user re-authentication based on the user biometric information being successful, switching the electronic apparatus to be in a second lock release state; and
based on the electronic apparatus being in the second lock release state, performing another user re-authentication based on the user biometric information.

9. The controlling method of claim 8,
wherein the user authentication information comprises a predetermined pattern or a password, and
wherein the user biometric information comprises a user fingerprint or a user iris.

10. The controlling method of claim 8, further comprising, switching the electronic apparatus to be in the lock state based on a failure of the another user re-authentication occurring.

11. The controlling method of claim 8, further comprising, as at least a part of the performing of the another user re-authentication, performing the user re-authentication based on a predetermined application being executed while the electronic apparatus is in the second lock release state.

12. The controlling method of claim 11, wherein the predetermined application comprises at least one of an application set to perform an automatic user login or an application storing user personal information, among applications providing a service requiring a user login.

13. The controlling method of claim 8, further comprising, as at least a part of the performing of the another user re-authentication, obtaining the user biometric information and performing the user re-authentication based on input user biometric information while a user inputs the user authentication information to switch the electronic apparatus to be in the second lock release state based on a failure of the user authentication occurring the predetermined number of times or more.

14. The controlling method of claim 13, further comprising, maintaining the electronic apparatus in the lock state based on a failure of the user re-authentication occurring.

15. The controlling method of claim 8, further comprising, in case of a predetermined application being executed after the electronic apparatus is switched to be in the first lock release state, performing the another user re-authentication.

16. The controlling method of claim 8, further comprising, in case of a predetermined application being executed while the electronic apparatus is in the second lock release state, performing the another user re-authentication.

\* \* \* \* \*